US012552832B2

United States Patent
Bobolowski et al.

(10) Patent No.: US 12,552,832 B2
(45) Date of Patent: Feb. 17, 2026

(54) IMMUNOGLOBULIN BINDING POLYPEPTIDES

(71) Applicant: Navigo Proteins GmbH, Halle/Saale (DE)

(72) Inventors: Hanna Bobolowski, Halle/Saale (DE); Erik Fiedler, Halle/Saale (DE); Ulrich Haupts, Halle/Saale (DE)

(73) Assignee: Navigo Proteins GmbH, Halle/Saale (DE)

(*) Notice: Subject to any disclaimer, the term of this patent is extended or adjusted under 35 U.S.C. 154(b) by 704 days.

(21) Appl. No.: 17/909,555

(22) PCT Filed: Mar. 5, 2021

(86) PCT No.: PCT/EP2021/055630
§ 371 (c)(1),
(2) Date: Sep. 6, 2022

(87) PCT Pub. No.: WO2021/176075
PCT Pub. Date: Sep. 10, 2021

(65) Prior Publication Data
US 2023/0212218 A1 Jul. 6, 2023

(30) Foreign Application Priority Data
Mar. 6, 2020 (EP) .................................. 20161427

(51) Int. Cl.
*C07K 1/22* (2006.01)
*C07K 17/12* (2006.01)
(52) U.S. Cl.
CPC ............... *C07K 1/22* (2013.01); *C07K 17/12* (2013.01)

(58) Field of Classification Search
CPC .......... C07K 1/22; C07K 17/12; C07K 14/435
See application file for complete search history.

(56) References Cited

U.S. PATENT DOCUMENTS

2015/0080558 A1   3/2015  Spector
2015/0252085 A1*  9/2015  Spector .............. C07K 16/1271
                                                        530/389.5

FOREIGN PATENT DOCUMENTS

WO   WO 2012/087230   6/2012
WO   WO 2018/029158   2/2018

OTHER PUBLICATIONS

International Search Report corresponding to International Application No. PCT/EP2021/055630 dated Jun. 4, 2021.
(Continued)

*Primary Examiner* — Robert B Mondesi
*Assistant Examiner* — Benjamin Hall Easton
(74) *Attorney, Agent, or Firm* — Jenkins, Taylor & Hunt, P.A.

(57) ABSTRACT

The present invention relates to novel engineered artificial immunoglobulin (Ig) binding polypeptides comprising three domains and two linkers. The invention further relates to affinity matrices comprising these artificial Ig binding molecules of the invention. The novel Ig binding proteins are particularly useful for the affinity purification of proteins requiring elution at a higher pH (in particular higher than pH 4.2). The invention also relates to a use of the novel Ig binding proteins or affinity matrices for affinity purification of immunoglobulins and to methods of affinity purification using the novel Ig binding proteins of the invention.

14 Claims, 7 Drawing Sheets

Specification includes a Sequence Listing.

Schematic drawing of the structure of Ig binding molecules compared to domain B or other proteins with Protein A like structure

(56) References Cited

OTHER PUBLICATIONS

Written Opinion corresponding to International Application No. PCT/EP2021/055630 dated Sep. 10, 2021.

\* cited by examiner

FIGURE 1. Amino acid sequences of Immunoglobulin binding proteins

FIGURE 1A. Amino acid sequences of selected Ig binding proteins SEQ ID NOs: 31-42

| SEQ ID NO: | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 31 | A | D | N | K | F | S | Q | S | A | N | L | L | A | E | A | K | K | L | N | D | A | Q | X | X | X | X | X | E | E | Q | R | N | G | F | I | Q | S | L | K | D | D | X | X | X | X | X | X | X | X | N | K | E | Q | N | A | F | Y | E | I | L | H | L | P | K |   |
| 32 | I | A | A | Q | H | S | V | S | L | E | I | L | A | E | A | K | K | L | N | D | A | Q | X | X | X | X | X | E | E | Q | R | N | A | F | I | Q | S | L | R | D | D | X | X | X | X | X | X | X | X | D | K | D | Q | A | A | F | Y | E | I | L | H | L | P | K |   |
| 33 | I | A | A | K | F | S | V | S | L | E | V | L | G | E | A | K | K | L | N | D | S | Q | X | X | X | X | X | E | E | Q | R | N | A | F | I | Q | S | L | R | D | D | X | X | X | X | X | X | X | X | D | E | A | Q | Q | A | A | F | Y | E | I | L | H | L | P | K |
| 34 | I | D | A | K | F | S | V | S | L | A | L | L | A | E | A | K | K | L | N | D | A | Q | X | X | X | X | X | E | E | D | Q | R | N | A | F | I | Q | S | L | R | D | D | X | X | X | X | X | X | X | D | E | A | Q | Q | A | A | F | Y | E | I | L | H | L | P | K |
| 35 | I | D | A | K | F | S | V | S | K | E | L | L | A | E | A | K | K | L | N | D | A | Q | X | X | X | X | X | E | E | D | Q | R | N | A | F | I | Q | S | L | R | D | D | X | X | X | X | X | X | X | D | E | A | Q | Q | A | A | F | Y | E | I | L | H | L | P | K |
| 36 | A | D | N | K | F | S | Q | S | A | N | L | L | A | E | A | K | K | L | N | D | A | Q | X | X | X | X | X | E | E | Q | R | N | G | F | I | Q | S | L | K | D | D | X | X | X | X | X | X | X | X | N | K | E | Q | Q | A | A | F | Y | E | I | L | H | L | P | K |
| 37 | A | D | N | N | F | S | Q | S | A | N | L | L | A | E | A | K | K | L | N | E | S | Q | X | X | X | X | X | E | E | Q | R | N | A | F | I | Q | S | L | K | D | D | X | X | X | X | X | X | X | X | N | K | E | Q | Q | N | A | F | Y | E | I | L | N | M | P | K |
| 38 | V | D | N | K | F | S | Q | S | A | N | L | L | A | E | A | K | K | L | N | D | A | Q | X | X | X | X | X | E | E | Q | R | N | A | F | I | Q | S | L | K | D | D | X | X | X | X | X | X | X | X | N | K | E | Q | Q | N | A | F | Y | E | I | L | H | L | P |   |
| 39 | A | D | N | K | F | S | Q | S | A | N | L | L | A | E | A | K | K | L | N | D | A | Q | P | T | L |   |   | E | E | Q | R | N | G | F | I | Q | S | L | K | D | D | A | L | G | N | A | N | N | K | E | Q | Q | N | A | F | Y | E | I | L | H | L | P | K |   |
| 40 | A | D | N | K | F | S | Q | S | A | N | L | L | A | E | A | K | K | L | N | D | A | Q | G | R | L | T |   | E | E | Q | R | N | A | F | I | Q | S | L | K | D | D | V | R | T | E | H | A | N | K | E | Q | N | A | F | Y | E | I | L | H | L | P | K |   |   |
| 41 | A | D | N | K | F | S | Q | S | A | N | L | L | A | E | A | K | K | L | N | D | A | Q | G | G | I | T |   | E | E | Q | R | N | G | F | I | Q | S | L | K | D | D | I | G | A | S | P | M | N | K | E | Q | Q | N | A | F | Y | E | I | L | H | L | P | K |   |
| 42 | A | D | N | K | F | S | Q | S | A | N | L | L | A | E | A | K | K | L | N | D | A | Q | G | G | L | T |   | E | E | Q | R | N | G | F | I | Q | S | L | K | D | D | V | P | A | G | V | A | N | N | K | E | Q | Q | N | A | F | Y | E | I | L | H | L | P | K |

FIG. 1 cont'd

FIGURE 1B. Amino acid sequences of Ig binding molecules of SEQ ID NOs: 53-71

| SEQ ID NO: | CID | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 | 52 | 53 | 54 | 55 | 56 | 57 | 58 | 59 | 60 | 61 | 62 | 63 | 64 |
|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|---|
| 53 | 213333 | A | D | N | K | F | S | Q | S | A | N | L | L | A | E | A | K | K | L | N | D | A | Q | G | G | I | T | E | E | Q | R | N | G | F | I | Q | S | L | K | D | D | A | K | T | N | P | G | N | K | E | Q | N | A | F | Y | E | I | L | H | L | P | K |  |
| 54 | 213278 | A | D | N | K | F | S | Q | S | A | N | L | L | A | E | A | K | K | L | N | D | A | Q | G | G | L | T | E | E | Q | R | N | G | F | I | Q | S | L | K | D | D | M | N | V | G | K | H | N | K | E | Q | N | A | F | Y | E | I | L | H | L | P | K |  |
| 55 | 213276 | A | D | N | K | F | S | Q | S | A | N | L | L | A | E | A | K | K | L | N | D | A | Q | G | G | L | T | E | E | Q | R | N | G | F | I | Q | S | L | K | D | D | A | K | A | N | P | E | A | K | E | Q | N | A | F | Y | E | I | L | H | L | P | K |  |
| 56 | 213246 | A | D | N | K | F | S | Q | S | A | N | L | L | A | E | A | K | K | L | N | D | A | Q | G | G | L | T | E | E | Q | R | N | G | F | I | Q | S | L | K | D | D | V | R | R | V | G | S | N | K | E | Q | N | A | F | Y | E | I | L | H | L | P | K |  |
| 57 | 213235 | A | D | N | K | F | S | Q | S | A | N | L | L | A | E | A | K | K | L | I | S | D | Q | R | G | L | T | E | E | Q | R | N | G | F | I | Q | S | L | K | D | D | T | K | R | H | P | K | M | K | E | Q | N | A | F | Y | E | I | L | H | L | P | K |  |
| 58 | 213224 | A | D | N | K | F | S | Q | S | A | N | L | L | A | E | A | K | K | L | N | D | A | Q | N | G | L | T | E | E | Q | R | N | G | F | I | Q | S | L | K | D | D | V | R | T | N | G | A | N | K | E | Q | N | A | F | Y | E | I | L | H | L | P | K |  |
| 59 | 213215 | A | D | N | K | F | S | Q | S | A | N | L | L | A | E | A | K | K | L | N | D | A | Q | G | G | L | T | E | E | Q | R | N | G | F | I | Q | S | L | K | D | D | V | R | K | P | G | P | N | K | E | Q | N | A | F | Y | E | I | L | H | L | P | K |  |
| 60 | 213213 | A | D | N | K | F | S | Q | S | A | N | L | L | A | E | A | K | K | L | N | D | A | Q | G | G | L | T | E | E | Q | R | N | G | F | I | Q | S | L | K | D | D | H | T | P | T | R | G | N | K | E | Q | N | A | F | Y | E | I | L | H | L | P | K |  |
| 61 | 213204 | A | D | N | K | F | S | Q | S | A | N | L | L | A | E | A | K | K | L | N | D | A | Q | G | G | L | T | E | E | Q | R | N | G | F | I | Q | S | L | K | D | D | T | K | A | N | P | A | R | K | E | Q | N | A | F | Y | E | I | L | H | L | P | K |  |
| 62 | 213197 | A | D | N | K | F | S | Q | S | A | N | L | L | A | E | A | K | K | L | N | D | A | Q | G | G | L | T | E | E | Q | R | N | G | F | I | Q | S | L | K | D | D | T | A | A | N | P | T | A | N | K | E | Q | N | A | F | Y | E | I | L | H | L | P | K |  |
| 63 | 213191 | A | D | N | K | F | S | Q | S | A | N | L | L | A | E | A | K | K | L | N | D | A | Q | G | G | I | T | E | E | Q | R | N | G | F | I | Q | S | L | K | D | D | G | T | E | G | V | H | N | K | E | Q | N | A | F | Y | E | I | L | H | L | P | K |  |
| 64 | 213195 | A | D | N | K | F | S | Q | S | A | N | L | L | A | E | A | K | K | L | N | D | A | Q | G | G | L | T | E | E | Q | R | N | G | F | I | Q | S | L | K | D | D | I | V | G | G | R | A | N | K | E | Q | N | A | F | Y | E | I | L | H | L | P | K |  |
| 65 | 210279 | A | D | N | K | F | S | Q | S | A | N | L | L | A | E | A | K | K | L | N | D | A | Q | G | G | L | T | E | E | Q | R | N | G | F | I | Q | S | L | K | D | D | T | H | P | E | D | R | Q | H | K | E | Q | N | A | F | Y | E | I | L | H | L | P | K |  |
| 66 | 210259 | A | D | N | K | F | S | Q | S | A | N | L | L | A | E | A | K | K | L | N | D | A | Q | G | G | L | T | E | E | Q | R | N | G | F | I | Q | S | L | K | D | D | A | K | R | N | P | M | T | N | K | E | Q | N | A | F | Y | E | I | L | H | L | P | K |  |
| 67 | 210240 | A | D | N | K | F | S | Q | S | A | N | L | L | A | E | A | K | K | L | N | D | A | Q | G | G | L | T | E | E | Q | R | N | G | F | I | Q | S | L | K | D | D | P | V | L | R | G | K | P | N | K | E | Q | N | A | F | Y | E | I | L | H | L | P | K |  |
| 68 | 210234 | A | D | N | K | F | S | Q | S | A | N | L | L | A | E | A | K | K | L | N | D | A | Q | G | G | L | T | E | E | Q | R | N | G | F | I | Q | S | L | K | D | D | A | S | E | K | G | A | N | K | E | Q | N | A | F | Y | E | I | L | H | L | P | K |  |
| 69 | 213265 | A | D | N | K | F | S | Q | S | A | N | L | L | A | B | A | K | K | L | N | D | A | Q | G | G | L | T | E | E | Q | R | N | G | F | L | Q | S | L | K | M | D | M | L | A | L | N | S | P | N | K | E | Q | N | A | F | Y | E | I | L | H | L | P | K |  |
| 70 | 208514 | A | D | N | K | F | S | Q | S | A | N | L | L | A | E | A | K | K | L | N | D | A | Q | G | G | L | T | E | E | Q | R | N | G | F | I | Q | S | L | K | D | D | V | P | G | V | T | S | A | N | K | E | Q | N | A | F | Y | E | I | L | H | L | P | K |  |
| 71 | 213249 | A | D | N | K | F | S | Q | S | A | N | L | L | A | B | A | K | K | L | N | D | A | Q | E | G | L | T | E | E | Q | R | N | G | F | I | Q | S | L | K | D | D | N | R | L | T | K | D | N | K | E | Q | N | A | F | Y | E | I | L | H | L | P | K |  |

FIGURE 1C. Schematic drawing of the structure of Ig binding molecules compared to domain B or other proteins with Protein A like structure FIGURE 2. Binding to hIgG1-Fc
FIGURE 2A. Ig binding molecules 208846 and 208847
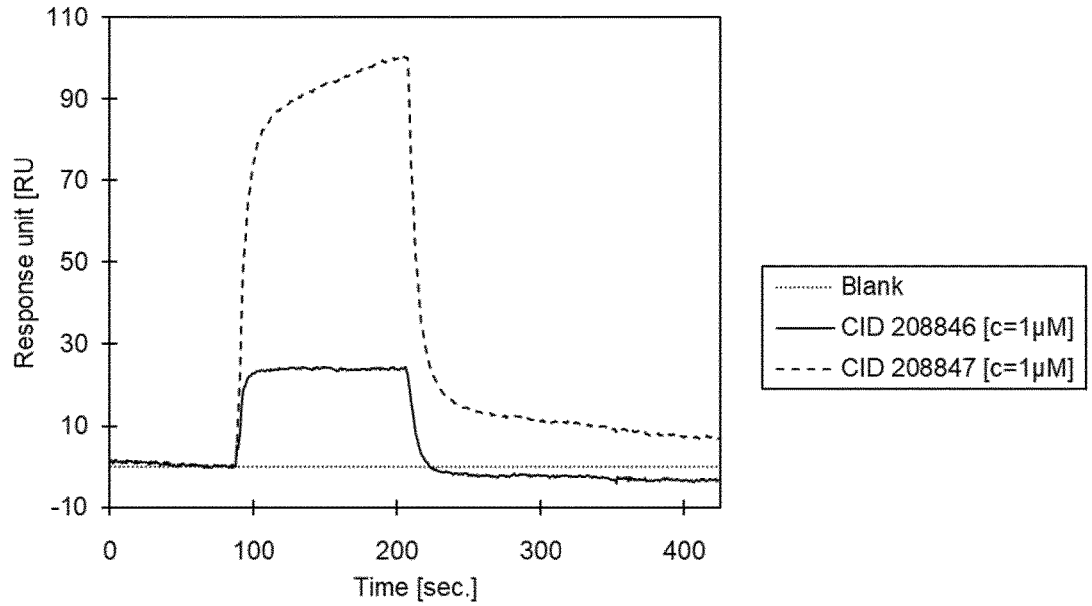
FIGURE 2B. SPR analysis of Ig binding molecules 213333 vs hIgG$_1$-Fc shows binding in two digit nM range
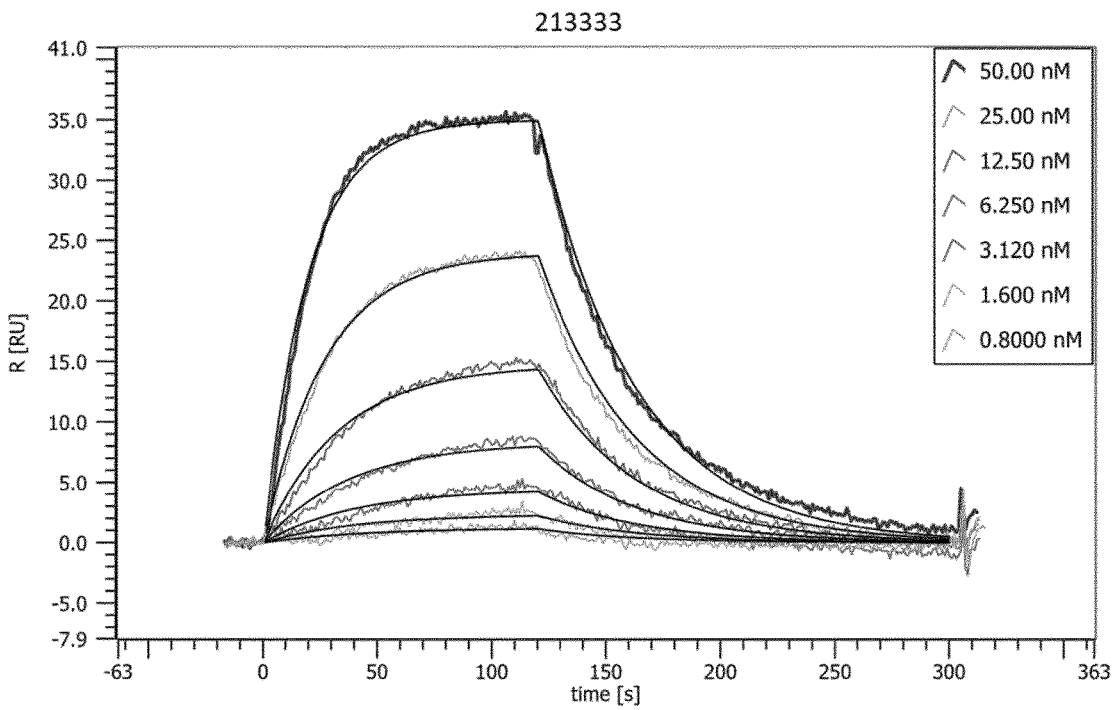

FIGURE 2C. SPR analysis of domain B vs hIgG1-Fc

FIGURE 3. Affinity measurement of Avelumab-Fab shows that Ig binding proteins of the invention <u>do not bind to Fab</u> whereas domain B binds Fab fragments of Immunoglobulin FIGURE 4. Competitive ELISA: Ig binding molecules compete with native domain B for hIgG-Fc binding
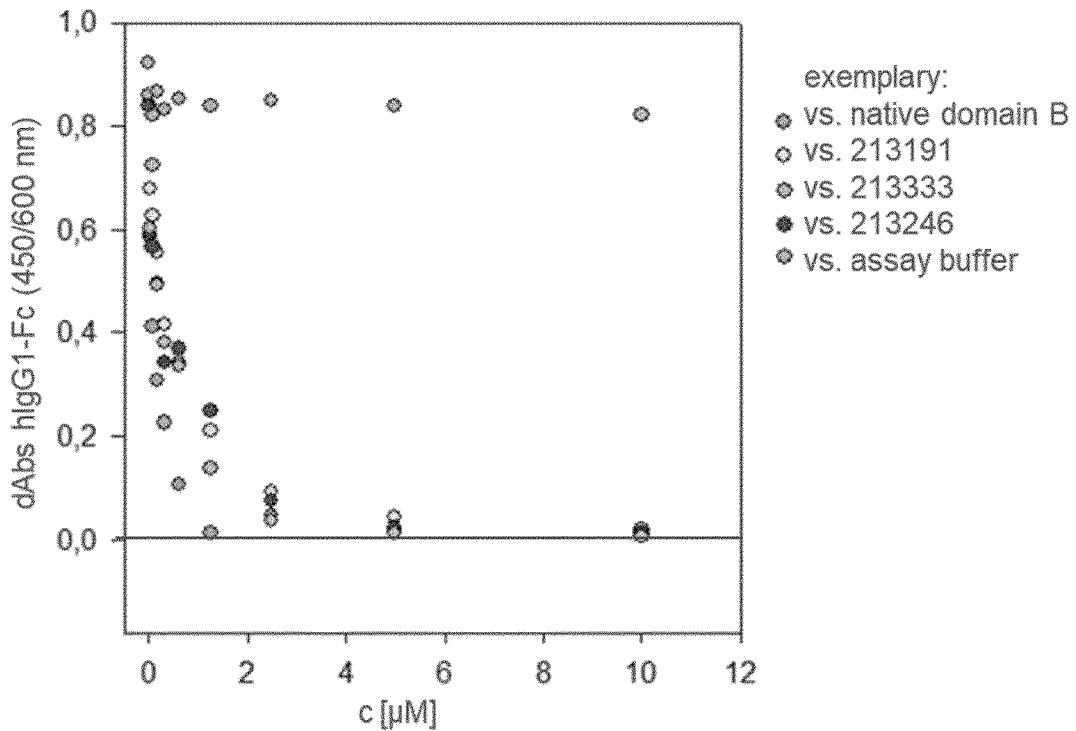
FIGURE 5. CD Spectroscopy: Ig binding molecules spectra are dominated by alpha-helical species
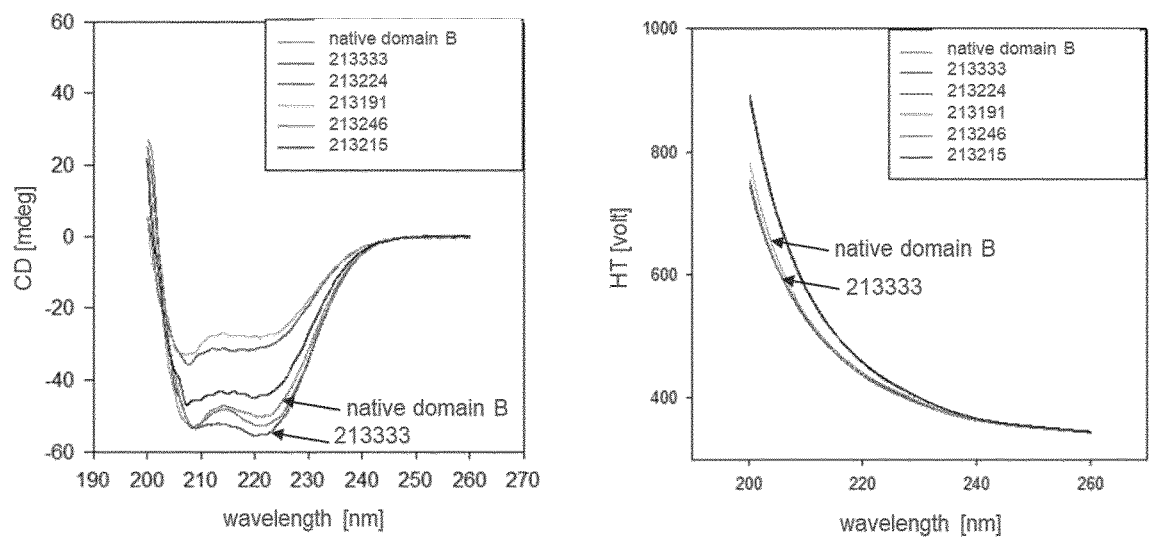

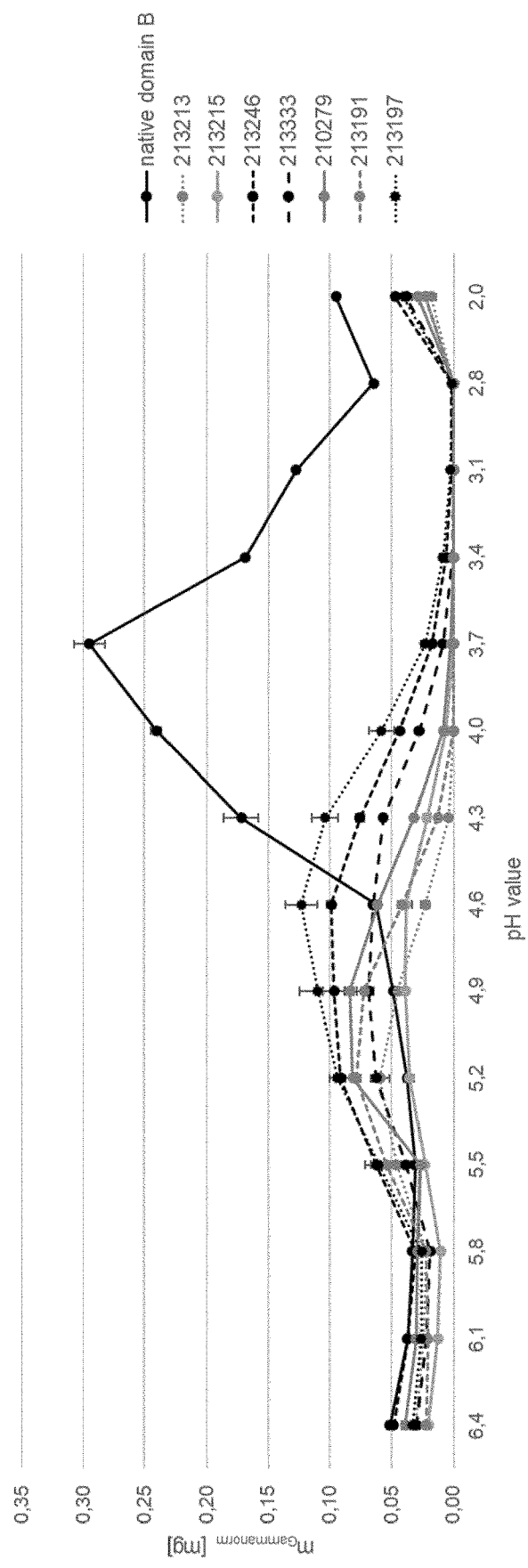
FIGURE 6. Elution of Gammanorm from Praesto 85 epoxy activated resin at high pH values

IMMUNOGLOBULIN BINDING POLYPEPTIDES

CROSS REFERENCE TO RELATED APPLICATIONS

The present application is a United States National Stage Application of PCT International Patent Application Serial No. PCT/EP2021/055630, filed Mar. 5, 2021, which itself claims the benefit of European Patent Application No. EP 20161427.8, filed Mar. 6, 2020, the disclosure of each of which is incorporated herein by reference in its entirety.

REFERENCE TO SEQUENCE LISTINGS

The Sequence Listing associated with the instant disclosure was submitted to the United States Patent and Trademark Office as a 59,787 byte ST25 text file created on Sep. 6, 2022 and entitled "3073_23_PCT_US_STs5.txt". This Sequence Listing was replaced with a Replacement Sequence Listing submitted to the United States Patent and Trademark Office as a 61,027 byte ST25 text file created on Jul. 29, 2025 and entitled "Replacement 3073_23_PCT_US.txt". The Sequence Listings submitted to the United States Patent and Trademark Office are both hereby incorporated by reference in their entireties.

FIELD OF THE INVENTION

The present invention relates to novel engineered immunoglobulin (Ig) binding polypeptides comprising three domains and two linkers. The invention further relates to affinity matrices comprising these artificial Ig binding molecules of the invention. The novel Ig binding proteins are particularly useful for the affinity purification of proteins requiring elution at a higher pH (in particular higher than pH 4.2). The invention also relates to a use of the novel Ig binding proteins or affinity matrices for affinity purification of immunoglobulins and to methods of affinity purification using the novel Ig binding proteins of the invention.

BACKGROUND OF THE INVENTION

Many biotechnological and pharmaceutical applications require the removal of contaminants from a sample containing antibodies. An established procedure for capturing and purifying antibodies is affinity chromatography using the bacterial cell surface Protein A from *Staphylococcus aureus* as selective ligand for immunoglobulins (see, for example, review by Huse et al., J. Biochem. Biophys. Methods 51, 2002:217-231). Wild-type Protein A binds to IgG molecules with high affinity and selectivity. Variants of Protein A with improved properties such as alkaline stability and various chromatographic matrices comprising such Protein A ligands for purifying antibodies are commercially available. However, currently available Protein A ligands for chromatography matrices show several technical limitations, e.g. a loss of binding capacity for immunoglobulins following exposure to alkaline conditions or incomplete elution of antibodies. In particular, most available Protein A ligands do not allow elution of antibodies at higher (milder) pH values.

Technical Problems Underlying the Invention

Most large-scale production processes for antibodies or Fc-containing fusion proteins use Protein A for affinity purification. However, due to limitations of Protein A applications in affinity chromatography there is a need in the art to provide novel Ig binding proteins with improved properties that specifically bind to immunoglobulins, in particular to the Fc domain, in order to facilitate affinity purification of immunoglobulins. Some immunoglobulins have the tendency to form aggregates at low pH values and thus require mild elution conditions. Accordingly, there is an ongoing need in this field to obtain novel proteins capable of binding proteins comprising an Fc domain and to allow mild elution conditions for proteins comprising an Fc domain.

The present invention provides novel artificial Ig binding proteins that are particularly well-suited for affinity purification of immunoglobulins. In particular, the engineered Ig binding proteins of the invention have several surprising technical advantages such as specific affinity for Immunoglobulin, in particular for the Fc part of Immunoglobulin, that makes them useful as ligands for affinity purification of immunoglobulins, in particular those that require milder elution conditions. The novel Ig binding proteins of the invention have proven to be valuable tools for the purification of immunoglobulins or of fusion proteins with Fc fragments.

The above overview does not necessarily describe all problems solved by the present invention.

SUMMARY OF THE INVENTION

An aspect of the present invention is to provide an Ig binding protein suitable for affinity purification.

1. This is achieved with an immunoglobulin (Ig)-binding protein comprising the following general structure from N- to C-terminus: domain 1-linker 1-domain 2-linker 2-domain 3, wherein (i) domain 1 comprises an amino acid sequence, which is at least 70% identical to the amino acid sequence of SEQ ID NO: 1 (SQSANLLAEAKKLNDAQ) or to SEQ ID NO: 4 (SVSLEILAEAKKLNDAQ); (ii) linker 1 has at least 3 amino acid residues; (iii) domain 2 comprises an amino acid sequence, which is at least 70% identical to the amino acid sequence of SEQ ID NO: 8 (EEQRNGFIQSLKDD) or to SEQ ID NO: 9 (EEQRNAFIQSLRDD); (iv) linker 2 has at least 6 amino acid residues; (v) domain 3 comprises an amino acid sequence, which is at least 70% identical to the amino acid sequence of SEQ ID NO: 13 (NKEQQNAFYEILHL) or to SEQ ID NO: 15 (DKEQQAAFYEILHL) and wherein the amino acid sequence of linker 1 is shorter than the amino acid sequence of linker 2.
2. The Ig-binding protein according to item 1, wherein linker 1 has at least 3 and no more than 5 amino acid residues, and/or linker 2 has at least 6 and no more than 8 amino acid residues.
3. The Ig-binding protein according to any one of items 1-2, wherein (i) linker 1 has 3 amino acid residues, and linker 2 has 6, 7, or 8 amino acid residues; (ii) linker 1 has 4 amino acid residues, and linker 2 has 6, 7, or 8 amino acid residues; or (iii) linker 1 has 5 amino acid residues, and linker 2 has 6, 7, or 8 amino acid residues.
4. The binding protein according to any one of items 1-3, wherein linker 1 comprises the amino acid sequence (i) XLT or XIT, wherein X may be any amino acid; or (ii) GGIX (SEQ ID NO: 19) or GGLX (SEQ ID NO: 20), wherein X may be any amino acid; or (iii) GGLT (SEQ ID NO: 104), GGIT (SEQ ID NO: 105), GGITT (SEQ ID NO: 106), NGLT (SEQ ID NO: 107), RGLT (SEQ ID NO: 108), GRLT (SEQ ID NO: 109); or PTL.

5. The binding protein according to any one of items 1-4, wherein linker 2 comprises amino acids selected from any amino acid, except an aromatic amino acid (including Trp (W), Phe (F), and Tyr (Y)), or cysteine (C).
6. The Ig-binding protein according to any one of items 1-5, wherein domain 1 is selected from SEQ ID NO: 1 (SQSANLLAEAKKLNDAQ), SEQ ID NO: 2 (SVSKEILAEAKKLNDAQ), SEQ ID NO: 3 (SQSANLLAEAKKLNESQ), SEQ ID NO: 4 (SVSLEILAEAKKLNDAQ), SEQ ID NO: 5 (SVSLEVLGEAQKLNDSQ), or SEQ ID NO: 6 (SVSLALLAEAKKLNDAQ), or amino acid sequences with at least 85% identity thereto; and. domain 2 is selected from SEQ ID NO: 8 (EEQRNGFIQSLKDD), SEQ ID NO: 9 (EEQRNAFIQSLRDD), SEQ ID NO: 10 (EDQRNAFIQSLRDD), or SEQ ID NO: 11 (EEQRNAFIQSLKDD), or amino acid sequences with at least 85% identity thereto; and domain 3 is selected from SEQ ID NO: 13 (NKEQQNAFYEILHL), SEQ ID NO: 14 (NKEQQNAFYEILNM), SEQ ID NO: 15 (DKDQQAAFYEILHL), SEQ ID NO: 16 (DEAQQAAFYEILHL), SEQ ID NO: 17 (DEAAQAAFYEILHL), or amino acid sequences with at least 85% identity thereto.
7. The Ig-binding protein according to any one of items 1-6, comprising 1, 2, 3, 4, or 5 amino acids added to the N-terminus of domain 1, selected from any amino acid, preferably selected from the group of alanine (A), valine (V), isoleucine (I), aspartate (D), glutamate (Q), asparagine (N), lysine (K), phenylalanine (F), and/or Histidine (H).
8. The Ig-binding protein according to any one of items 1-7, comprising 1 or 2 amino acids added to the C-terminus of domain 3, preferably selected from proline (P) or lysine (K).
9. The Ig-binding protein according to any one of items 1-8, comprising the amino acid sequence of any of SEQ ID NOs: 31-71, or amino acid sequences with 85% identity thereto.
10. The Ig-binding protein according to any one of items 1-9, comprising 2, 3, 4, 5, or 6 Ig-binding proteins linked to each other.
11. The Ig binding protein according to any one of 1-10, wherein said protein binds to IgG$_1$, IgG$_2$, IgG$_4$, IgM, IgA, Ig fragments, Fc fragments, or Fab fragments.
12. The Ig binding protein according to any one of items 1-11, wherein the protein is immobilized to a solid support.
13. An affinity separation matrix comprising a polypeptide according to any one of items 1-12.
14. Use of the Ig binding protein according to any one of items 1-12, or of the affinity separation matrix according to item 13, for purification of any protein with affinity to the Ig binding protein.
15. A method of affinity purification of a protein comprising an Ig sequence, the method comprising: (a) providing a liquid that contains a protein with affinity to Ig binding protein according to any one of items 1-12; (b) providing an affinity separation matrix according to item 13; (c) contacting said affinity separation matrix with the liquid under conditions that permit binding of the at least one Ig binding protein according to any one of items 1-12 to a protein comprising an Ig sequence; and (d) eluting said protein with affinity to Ig binding protein according to any one of items 1-12 from said affinity purification matrix, preferably at acidic conditions of pH 4.2 or higher, more preferably at acidic conditions of pH 4.2-pH 5.5.

This summary of the invention does not necessarily describe all features of the present invention. Other embodiments will become apparent from a review of the ensuing detailed description.

BRIEF DESCRIPTION OF THE FIGURES

In FIG. 1A and FIG. 1B, domain 1 is highlighted in medium grey, domain 2 is highlighted in light grey, and domain 3 is highlighted in dark grey. Shown is the general structure from N- to C-terminus. X can be any amino acid. In positions 26, 27, 48, and 49 of SEQ ID NOs: 31-38, X may be any naturally occurring amino acid, or may be absent.

FIG. 1A: shows the amino acid sequences of SEQ ID NOs: 31-42.

FIG. 1B: shows the amino acid sequences of additional novel artificial Ig binding proteins (SEQ ID NOs: 53-71). CID refers to the clone identification number of the respective Ig binding protein.

FIG. 1C: shows a schematic drawing of the structure of the novel Ig binding molecules of the invention as compared to native wild type domain B of *Staphylococcus aureus* Protein A (SpA). The three-helical bundle shown on the left hand reflects the SpA wild type domain B, having "wild type" helices 1, 2, and 3 arranged from the N- to C-terminus. The three-helical bundle shown on the right hand reflects the engineered artificial Ig binding molecules of the invention, thereby using the "wild type" helix numbering to show the different arrangement of the helices: in the artificial Ig binding molecules of the invention, the helix corresponding to "wild type" helix 3 is present at the N-terminus, thus preceding helices 1 and 2, and the helix corresponding to "wild type" helix 2 is located N-terminal of the helix corresponding to "wild type" helix 1. Accordingly, in the three-helical bundle shown on the right hand exemplifying the artificial Ig binding molecules of the invention, helix 3 reflects domain 1 of the present invention, helix 2 reflects domain 2 of the present invention, and helix 1 reflects domain 3 of the present invention.

FIG. 2A shows the polypeptides of SEQ ID NOs: 41 and 42 (CID208846, CID208847, respectively) with binding affinity for IgG$_1$ Fc region. Solid line=Ig binding protein SEQ ID NO: 41; dotted line=Ig binding protein SEQ ID NO: 42.

FIG. 2B shows the Ig binding molecule "CID213333" with binding affinity for IgG$_1$ Fc region. Ig binding molecule CID213333 shows binding vs hIgG1-Fc in two digit nM range. Other Ig binding molecules of the invention have comparable binding affinities (see Examples).

FIG. 2C shows SPR analysis of native SpA domain B.

FIG. 3: shows the affinity measurement of Avelumab-Fab versus exemplary Ig binding proteins of the invention compared to domain B. The figure shows specific binding of Ig binding proteins of the invention to Fc, but interestingly no binding to Fab, whereas domain B of *Staphylococcus aureus* (SpA) binds to both Fc and Fab.

FIG. 4: shows a competitive ELISA of Ig binding molecule of the invention vs. native domain B (c=100 nM). Ig binding molecules of the invention serial diluted, tag-free; immobilization of hIgG1-Fc (c=1 μg/ml), detection via Strep-Tactin HRP. The figure shows a concentration dependent decrease of the hIgG$_1$-Fc signal, thus native SpA domain B and Ig binding molecules of the invention compete for hIgG$_1$-Fc binding. Ig binding molecules CID213191, CID213333, and CID213246 were tested. The corresponding sequences are shown in FIG. 1B.

FIG. 5: shows CD spectroscopy of Ig binding molecules of the invention compared to native domain B. The spectra of the Ig binding molecules are dominated by alpha-helical species. Ig binding molecules CID213333, CID213224, CID213191, CID213215, and CID213246 were tested. The corresponding sequences are shown in FIG. 1B. The spectra of CID213333 and CID213246 are comparable to those of domain B. Ig binding molecules (c=0.2 mg/ml), measurement at 20° C., accumulation 16×; d=1 mm.

FIG. 6: shows the elution of Gammanorm from Praesto 85 epoxy activated resin at high pH values. Elution cycles with 50 mM citrate, pH 6.4 to 2.0. Seven exemplary Ig binding molecules of the invention were analyzed and compared to native domain B. Ig binding molecules of the invention allow the elution of Gammanorm at high pH values (higher than pH 4.5, in particular at pH 5.2-4.6), in contrast to domain B (elution at pH 3.7).

DETAILED DESCRIPTION OF THE INVENTION

Figure 1:
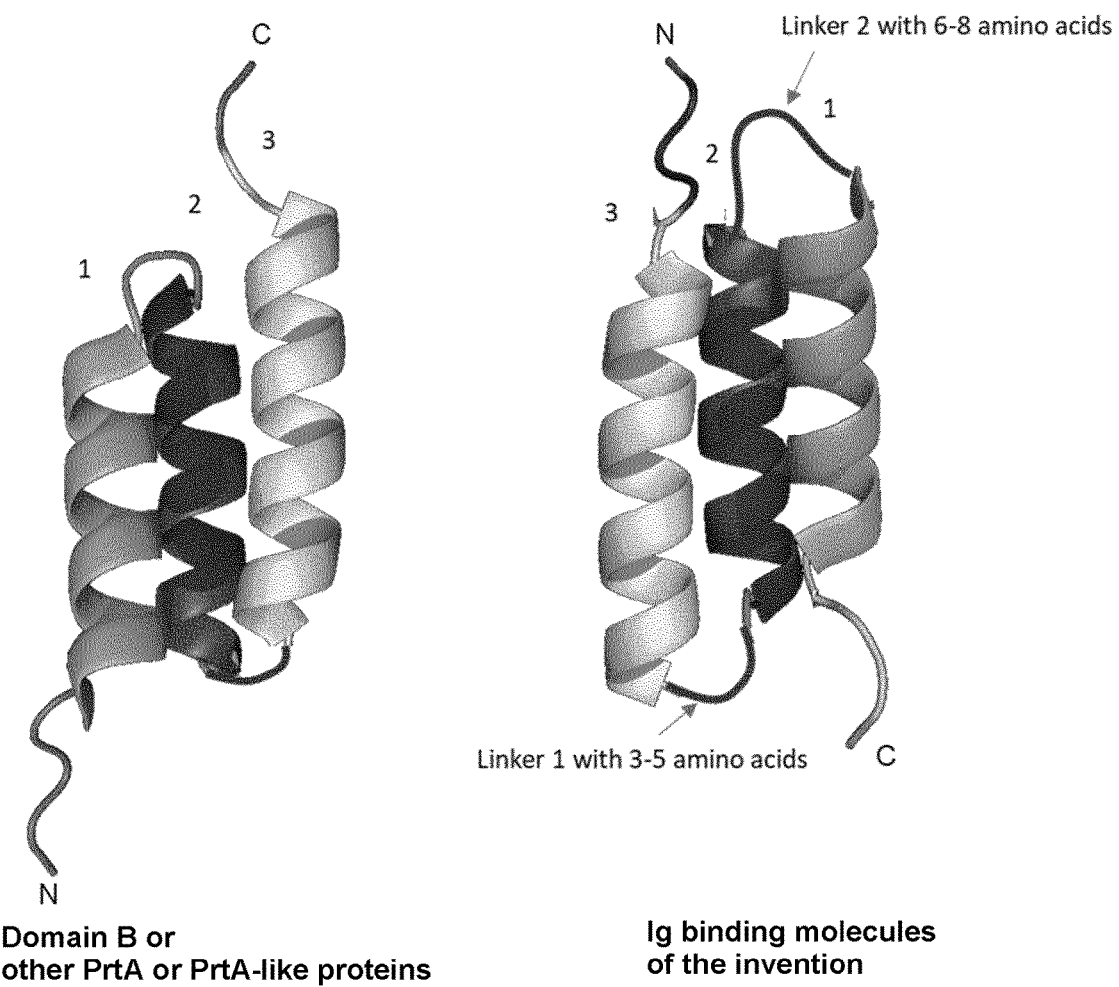
FIG. 1: shows amino acid sequences of exemplary novel Ig binding proteins of the invention. The numbers in the top row refer to the corresponding amino acid position in the Ig binding protein.

Before the present invention is described in detail below, it is to be understood that this invention is not limited to the particular methodology, protocols and reagents described herein as these may vary. It is also to be understood that the terminology used herein is for the purpose of describing particular embodiments only and is not intended to limit the scope of the present invention which will be limited only by the appended items. Unless defined otherwise, all technical and scientific terms used herein have the same meanings as commonly understood by one of ordinary skill in the art to which this invention belongs.

Preferably, the terms used herein are consistent with the definitions provided in "A multilingual glossary of biotechnological terms: (IUPAC Recommendations)", Leuenberger, H. G. W, Nagel, B. and Kölbl, H. eds. (1995), Helvetica Chimica Acta, CH-4010 Basel, Switzerland).

Throughout this specification and the items which follow, unless the context requires otherwise, the word "comprise", and variations such as "comprises" and "comprising", will be understood to imply the inclusion of a stated member, integer or step or group of members, integers or steps but not the exclusion of any other member, integer or step or group of members, integers or steps.

As used in the description of the invention and the appended items, the singular forms "a", "an" and "the" are used interchangeably and intended to include the plural forms as well and fall within each meaning, unless the context clearly indicates otherwise. Also, as used herein, "and/or" refers to and encompasses any and all possible combinations of one or more of the listed items, as well as the lack of combinations when interpreted in the alternative ("or").

The term "about", as used herein, encompasses the explicitly recited amounts as well as deviations therefrom of ±10%. More preferably, a deviation 5% is encompassed by the term "about".

Several documents (for example: patents, patent applications, scientific publications, manufacturer's specifications etc.) are cited throughout the text of this specification. Nothing herein is to be construed as an admission that the invention is not entitled to antedate such disclosure by virtue of prior invention. Some of the documents cited herein are characterized as being "incorporated by reference". In the event of a conflict between the definitions or teachings of such incorporated references and definitions or teachings recited in the present specification, the text of the present specification takes precedence.

All sequences referred to herein are disclosed in the attached sequence listing that, with its whole content and disclosure, is a part of this specification.

In the context of the present invention, the term "Ig binding protein" or "immunoglobulin-binding protein" is used to describe proteins that are capable to specifically bind to an immunoglobulin.

The Ig binding proteins of the present invention are sometimes be referred to herein as Ig binding molecules of the present invention, or ligands of the invention. The "immunoglobulin" or "Ig" as understood herein can include, but is not necessarily limited to, mammalian IgG, such as for example human IgG$_1$, human IgG$_2$, human IgG$_4$, mouse IgG, rat IgG, goat IgG, bovine IgG, guinea pig IgG, rabbit IgG; human IgM, human IgA; and an immunoglobulin fragment comprising a Fc region (also referred to as "Fc fragment" or "Fc" or "Fc domain" or "Fc portion", or "Fc part") and/or an immunoglobulin fragment comprising a Fab region (also referred to as "Fab fragment" or "Fab" or "Fab portion"). The Ig binding proteins are capable of binding to entire immunoglobulins, and to Ig fragments comprising a Fc region and/or Ig fragments comprising a Fab region. The term Fc means fragment crystallizable. The definition "immunoglobulin" as understood herein includes fusion proteins comprising an immunoglobulin, fragment of an immunoglobulin comprising a Fc region (Fc fragment), fragment of an immunoglobulin comprising a Fab region (Fab fragment), fusion proteins comprising a fragment of an immunoglobulin comprising a Fc region, fusion proteins comprising a fragment of an immunoglobulin comprising a Fab region, conjugates comprising an Ig or an Ig fragment comprising a Fc region (Fc fragment), and conjugates comprising an Ig fragment comprising a Fab region (Fab fragment).

In various embodiments, the Ig binding protein of the invention does not bind to, or has diminished or no detectable binding affinity or binding capacity to, the Fab portion or Fab region of an immunoglobulin. Accordingly, in various embodiments, the Ig binding proteins of the invention do not bind to, or have diminished or no detectable binding affinity or binding capacity to, Fab fragments, including isolated Fab fragments or Fab antibodies, i.e., including but not limited to Fab fragment antibodies generated by papain digestion of whole or full length immunoglobulins. Ig binding proteins of the invention otherwise maintain binding affinity or binding capacity to immunoglobulins, in particular to the Fc part of immunoglobulins. The binding affinity or binding capacity for the Fc or Fab region may be determined by Surface Plasmon Resonance (SPR) spectroscopy, kinetic exclusion analysis (KinExA assay), or enzyme-linked immunosorbent assay (ELISA).

As described herein, the term "Fab" or "Fab fragment" includes F(ab), F(ab'), and F(ab')$_2$ fragment immunoglobulins or antibodies. These structures are widely known in the art. It will be appreciated by a person of ordinary skill in the art, the Fab portion or Fab region of an immunoglobulin is the antigen-binding site or region of an immunoglobulin.

In various embodiments of the present invention, the term "immunoglobulin-binding protein" may be described as a "Fc binding protein", or a "protein binding to an immunoglobulin comprising a Fc region". In the context of the present invention, the term "immunoglobulin-binding protein" or "Fc binding protein" is used to describe proteins that are capable to specifically bind to an immunoglobulin, in particular to an Fc part of an immunoglobulin. The "Fc" as understood herein can include, but is not necessarily limited to, an Fc part of mammalian IgG, such as for example human $IgG_1$, human $IgG_2$, human $IgG_4$, mouse IgG, rat IgG, goat IgG, bovine IgG, guinea pig IgG, rabbit IgG; human IgM, human IgA; and an immunoglobulin fragment comprising a Fc region (also referred to as "Fc fragment" or "Fc"). The Ig binding proteins are capable of binding to entire immunoglobulins, and to Ig fragments comprising a Fc region. The definition "Fc" as understood herein includes fusion proteins comprising an immunoglobulin, fragment of an immunoglobulin comprising a Fc region (Fc fragment), fusion proteins comprising a fragment of an immunoglobulin comprising a Fc region, and conjugates comprising an Ig or an Ig fragment comprising a Fc region (Fc fragment). The term "binding" according to the invention preferably relates to a specific binding. "Specific binding" means that an Ig binding protein or an Ig binding protein binds stronger to an immunoglobulin for which it is specific compared to the binding to another non-immunoglobulin target.

In various embodiments, the engineered Ig binding proteins of the invention compete with native Ig binding proteins for Fc binding, in particular with native SpA domain B. In various embodiments, the engineered Ig binding proteins of the invention and native SpA domain B share the same epitope for binding to the Fc of an immunoglobulin.

As will be appreciated by a person of ordinary skill in the art, the term "immunoglobulins" encompasses "antibodies". Accordingly, in various embodiments, the term "immunoglobulin" may be described as "antibody", or both terms may be used interchangeably herein. Any definitions disclosed herein concerning the term "immunoglobulin" apply to the term "antibody" accordingly.

The term "binding activity" refers to the ability of an Ig binding protein of the invention to bind to immunoglobulin. For example, the binding activity can be determined before and/or after alkaline treatment. The terms (immunoglobulin) "binding activity" and "binding capacity" may be used interchangeably herein. The binding activity can be determined for an Ig binding protein or for an Ig binding protein coupled to a matrix, i.e. for an immobilized binding protein. The term "artificial" refers to an object that is not naturally occurring, i.e. the term refers to an object that has been produced or modified by man. For example, a polypeptide or polynucleotide sequence that has been generated by man (e.g. for example in a laboratory by genetic engineering, by shuffling methods, or by chemical reactions, etc.) or intentionally modified is artificial.

The term "dissociation constant" or "$K_D$" defines the specific binding affinity. As used herein, the term "$K_D$" (usually measured in "mol/L", sometimes abbreviated as "M") is intended to refer to the dissociation equilibrium constant of the particular interaction between a first protein and a second protein. In the context of the present invention, the term $K_D$ is particularly used to describe the binding affinity between an Ig binding protein and an immunoglobulin. An Ig binding protein of the invention is considered to bind to an immunoglobulin, if it has a dissociation constant $K_D$ to immunoglobulin of at least 1 µM or less, or preferably 100 nM or less, more preferably 50 nM or less, even more preferably 10 nM or less.

The terms "protein" and "polypeptide" refer to any linear molecular chain of two or more amino acids linked by peptide bonds and does not refer to a specific length of the product. Thus, "peptides", "protein", "amino acid chain," or any other term used to refer to a chain of two or more amino acids, are included within the definition of "polypeptide," and the term "polypeptide" may be used instead of, or interchangeably with any of these terms. The term "polypeptide" is also intended to refer to the products of post-translational modifications of the polypeptide, including without limitation glycosylation, acetylation, phosphorylation, amidation, proteolytic cleavage, modification by non-naturally occurring amino acids and similar modifications which are well-known in the art. Thus, Ig binding proteins comprising two or more protein domains also fall under the definition of the term "protein" or "polypeptides".

The term "variant" as used herein includes an amino acid sequence of an Ig binding protein or domain that differs from another amino acid sequence by at least one amino acid substitution, deletion or insertion. These modifications may be generated by genetic engineering or by chemical synthesis or chemical reactions carried out by man.

The term "conjugate" as used herein relates to a molecule comprising or essentially consisting of at least a first protein attached chemically to other substances such as to a second protein or a non-proteinaceous moiety.

The term "modification" or "amino acid modification" refers to an exchange, a deletion, or an insertion of an amino acid at a particular position in a polypeptide sequence by another amino acid. Given the known genetic code, and recombinant and synthetic DNA techniques, the skilled scientist can readily construct DNAs encoding the amino acid variants.

The term "substitution" or "amino acid substitution" refers to an exchange of an amino acid at a particular position in a polypeptide sequence by another amino acid. The term "deletion" or "amino acid deletion" refers to the removal of an amino acid at a particular position in a polypeptide sequence.

The term "insertions" or "amino acid insertion" refers to the addition of amino acids to the polypeptide sequence.

The term "amino acid sequence identity" refers to a quantitative comparison of the identity (or differences) of the amino acid sequences of two or more proteins. "Percent (%) amino acid sequence identity" or "percent identical" or "percent identity" with respect to a reference polypeptide sequence is defined as the percentage of amino acid residues in a sequence that are identical with the amino acid residues in the reference polypeptide sequence, after aligning the sequences and introducing gaps, if necessary, to achieve the maximum percent sequence identity. In various embodiments, the term "sequence identity" means that two (nucleotide or) amino acid sequences, when optimally aligned, such as by the programs GAP or BESTFIT using default gap weights, share at least 70% sequence identity, or at least 80% sequence identity, or at least 85% sequence identity, or at least 90% sequence identity, or at least 95% sequence identity or more.

To determine the sequence identity, the sequence of a query protein is aligned to the sequence of a reference protein. Methods for alignment are well-known in the art. Methods for sequence alignment are well known in the art. For example, for determining the extent of an amino acid sequence identity of an arbitrary polypeptide relative to the reference amino acid sequence, the SIM Local similarity program is preferably employed. For multiple alignment analysis, ClustalW as known to someone skilled in the art is preferably used.

The extent of sequence identity is generally calculated with respect to the total length of the unmodified sequence. As used herein, the phrases "percent identical" or "percent (%) amino acid sequence identity" or "percent identity", in the context of two polypeptide sequences, refer to two or more sequences or subsequences that have in some embodiments at least 70%, at least 75%, in some embodiments at least 80%, some embodiments at least 85%, in some embodiments at least 90%, in some embodiments at least 95%, in some embodiments at least 98%, and in some embodiments 100% amino acid residue identity, when compared and aligned for maximum correspondence, as measured using one of the following sequence comparison algorithms or by visual inspection. For clarity reasons, for example a sequence with at least 90% identity includes all sequences with identities higher than 90% identity, e.g. embodiments with at least 90 at least 91%, at least 92%, at least 93%, at least 94%, at least 95%, at least 96%, at least 97%, at least 98%, at least 99%, or 100% amino acid identity.

The percent identity exists in some embodiments over a region of at least 54 residues of an Ig binding protein of the invention. The percent identity exists in other embodiments over a region of 65 residues of an Ig binding protein of the invention. In various embodiments, an engineered Ig binding protein of the invention has a length of any of 54, 55, 56, 57, 58, 59, 60, 61, 62, 63, 64, or 65 amino acid residues, preferably a length of any of 61, 62, 63, 64, or 65 amino acid residues, in accordance with FIG. 1.

In some embodiments, the percent identity exists in some embodiments over an amino acid sequence of 14 residues (e.g., domain 2 or domain 3), or over an amino acid sequence of 17 residues (e.g. domain 1). In various embodiments, an engineered Ig binding protein of the invention has a domain 1 (or helix 1) with a length of about 17+/−1 amino acid residues, and/or has a domain 2 (or helix 2) with a length of about 14+/−1 amino acid residues, and/or has a domain 3 (or helix 3) with a length of about 14+/−1 amino acid residues. As further described herein, in the engineered Ig binding proteins of the invention, domain 1 (or helix 1) may encompass residues corresponding to positions 6-22 of any of the scaffolds of SEQ ID NOs: 31-38, and/or domain 2 (or helix 2) may encompass residues corresponding to positions 28-41 of any of the scaffolds of SEQ ID NOs: 31-38, and/or domain 3 (or helix 3) may encompass residues corresponding to positions 50-63 of any of the scaffolds of SEQ ID NOs: 31-38.

As further described herein, in the engineered Ig binding proteins of the invention, linker 1 may encompass residues corresponding to positions 23-27 of any of the scaffolds of SEQ ID NOs: 31-38, and/or linker 2 may encompass residues corresponding to positions 42-49 of any of the scaffolds of SEQ ID NOs: 31-38.

As further described herein, the engineered Ig binding proteins of the invention may encompass amino acids at the N-terminus and adjacent to domain 1, corresponding to amino acids at positions 1-5 of any of the scaffolds of SEQ ID NOs: 31-38.

The term "fused" means that the components are linked by peptide bonds, either directly or via peptide linkers.

The term "fusion protein" relates to a protein comprising at least a first protein joined genetically to at least a second protein. A fusion protein is created through joining of two or more genes that originally coded for separate proteins. Thus, a fusion protein may comprise a multimer of identical or different proteins which are expressed as a single, linear polypeptide.

As used herein, the term "linker" refers in its broadest meaning to a molecule that covalently joins two other molecules, e.g. two domains. In typical embodiments of the present invention, a "linker" is to be understood as a moiety that connects a domain with another domain. In preferred embodiments, the "linker" is a peptide linker, i.e. the moiety linking two domains is a peptide comprising two or more (up to 10) amino acids. In various embodiments, a dimer or multimer of the present invention may comprise a linker joining two or more Ig binding proteins with each other.

The term "chromatography" refers to separation technologies which employ a mobile phase and a stationary phase to separate one type of molecules (e.g., immunoglobulins) from other molecules (e.g. contaminants) in the sample. The liquid mobile phase contains a mixture of molecules and transports these across or through a stationary phase (such as a solid matrix). Due to the differential interaction of the different molecules in the mobile phase with the stationary phase, molecules in the mobile phase can be separated.

The term "affinity chromatography" refers to a specific mode of chromatography in which a ligand coupled to a stationary phase interacts with a molecule (i.e. immunoglobulin) in the mobile phase (the sample) i.e. the ligand has a specific binding affinity for the molecule to be purified. As understood in the context of the invention, affinity chromatography involves the addition of a sample containing an immunoglobulin to a stationary phase which comprises a chromatography ligand, such as an Ig binding protein of the invention.

The terms "solid support" or "solid matrix" are used interchangeably for the stationary phase.

The terms "affinity matrix" or "affinity separation matrix" or "affinity chromatography matrix", as used interchangeably herein, refer to a matrix, e.g. a chromatographic matrix, onto which an affinity ligand e.g., an Ig binding protein of the invention is attached. The ligand (e.g., Ig binding protein) is capable of specific binding to a molecule of interest (e.g., an immunoglobulin as defined above) which is to be purified or removed from a mixture (e.g., in a liquid sample). As will be appreciated by a person of ordinary skill in the art, the terms "affinity matrix" or "affinity separation matrix" or "affinity chromatography matrix" describe the separation of a molecule of interest (in particular an immunoglobulin) by using an Ig binding protein of the invention. Accordingly, the terms "affinity matrix" or "affinity separation matrix" or "affinity chromatography matrix" or "separation matrix" may be used interchangeably herein.

The term "affinity purification" as used herein refers to a method of purifying immunoglobulins as defined above from a liquid (sample) by binding immunoglobulins as defined above to an Ig binding protein that is immobilized to a matrix. Thereby, all other components of the mixture except immunoglobulins are removed. In a further step, immunoglobulins are eluted and obtained in purified form. The terms "affinity purification" or "affinity chromatography purification" or "affinity separation" or "affinity chromatography separation" may be used interchangeably herein.

Embodiments of the Invention

The present invention will now be further described. In the following passages different embodiments of the invention are defined in more detail. Each embodiment defined below may be combined with any other embodiments unless clearly indicated to the contrary. In particular, any feature indicated as being preferred or advantageous may be combined with any other feature or features indicated as being preferred or advantageous.

The surprising advantage of the Ig binding proteins of the invention is the use in affinity chromatography as affinity ligands for immunoglobulin.

In one embodiment, the immunoglobulin (Ig)-binding protein comprises the following general structure: domain 1-linker 1-domain 2-linker 2-domain 3 from the N- to C-terminus, wherein (i) domain 1 (N-terminal location) comprises an amino acid sequence, which is at least 70% identical to the amino acid sequence of SEQ ID NO: 1 (SQSANLLAEAKKLNDAQ) or to SEQ ID NO: 4 (SVSLEILAEAKKLNDAQ); (ii) linker 1 (between domain 1 and domain 2) has at least 3 amino acid residues; (iii) domain 2 (between domain 1 and domain 2) comprises an amino acid sequence, which is at least 70% identical to the amino acid sequence of SEQ ID NO: 8 (EEQRNGFIQSLKDD) or to SEQ ID NO: 9 (EEQRNAFIQSLRDD); (iv) linker 2 (between domain 2 and domain 3 has at least 6 amino acid residues; and (v) domain 3 (C-terminal location) comprises an amino acid sequence, which is at least 70% identical to the amino acid sequence of SEQ ID NO: 13 (NKEQQNAFYEILHL) or to SEQ ID NO: 15 (DKEQQAAFYEILHL), (vi) wherein the amino acid sequence of linker 1 is shorter than the amino acid sequence of linker 2.

The Ig binding proteins comprise as structural elements domain 1, linker 1, domain 2, linker 2, domain 3 connected in a head-to-tail arrangement. A "head-to-tail arrangement" as understood herein is an arrangement of domain 1, linker 1, domain 2, linker 2, domain 3 in the direction N-terminus to C-terminus (i.e. domain 1 N-terminal). The Ig binding proteins of the invention comprise three domains, probably structurally helical regions, and two linker regions, probably structurally loop regions in novel N- to C-terminus arrangement. The at least 3 amino acid residues referred to as "linker 1" herein connect the 17 amino acid residues referred to as "domain 1" and the 14 amino acid residues referred to as "domain 2". Further, Ig binding proteins of the invention comprise three domains, (probably helical regions), and two linker (probably loop regions), wherein the at least 6 amino acid residues referred to as "linker 2" herein connects the 14 amino acid residues referred to as "domain 2" and the 14 amino acid residues referred to as "domain 3". The 17 amino acids of "domain 1" are located at the N-terminal region of the Ig binding protein, wherein 14 amino acids of "domain 3" are located at the C-terminal region of the Ig binding protein. Thus, an Ig binding protein of the invention comprises at least 54 amino acids. In line with the above, and as will be appreciated by a person of ordinary skill in the art, the terms "domain 1", "domain 2", and "domain 3" used herein may be described as "helix 1", "helix 2", and "helix 3", respectively. As will be further appreciated by a person of ordinary skill in the art, the Ig binding proteins of the invention may be described as polypeptides having a "triple-helical structure" or "three-helix structure", i.e., polypeptides with three-helix bundles, wherein the polypeptide comprises at least 54 amino acids.

It has surprisingly been found that the engineered Ig binding proteins of the invention are stable at low pH without significantly losing Ig binding properties. Further, an important step in affinity chromatography is the elution of the protein of interest, in particular an immunoglobulin of interest, that is bound to the Ig binding protein of the invention. This step is usually done at low pH. The affinity ligands of the invention do not lose binding properties to Ig after this treatment, while elution of the protein of interest is possible at low pH.

In some circumstances, it is important to have conditions for the elution of antibodies (immunoglobulins) from the affinity ligand at a pH higher than pH 3.7, such as pH 4.3 and above, for example, up to pH 5.5. It has surprisingly been found that the engineered Ig binding proteins of the invention allow elution of the bound Ig protein of interest at pH higher than 4.0, or even higher than pH 4.3, and up to and including pH 5.5.

The engineered Ig binding proteins of the invention are particularly suitable for elution of Ig molecules of interest from the immobilized ligand at mild pH conditions (up to pH 5.5) (see Example 10 and FIG. 6). This feature is particularly useful for isolating immunoglobulins, in particular Ig having an Fc region, using separation matrices, wherein the elution step has to be carried out at mild acidic conditions higher than pH 3.7, in particular in the range of pH 4.0 up to and including pH 5.5. In various embodiments, the Ig binding proteins of the invention are particularly suitable for elution of Ig molecules at acidic conditions of pH 4.2 or 4.3 or higher, preferably at acidic conditions of pH 4.5 or higher, more preferably at acidic conditions of any of pH 4.2, 4.3, and 4.5 up to and including pH 5.5.

Structural definition: linker 1 of the Ig binding protein and linker 2 of the Ig binding protein. In the Ig binding proteins of the invention, the amino acid sequence of the region in the Ig binding protein referred to as linker 1 is shorter than the amino acid sequence of the region in the Ig binding protein referred to as linker 2. In some embodiments, linker 1 between domain 1 and domain 2 has at least 3 and no more than 5 amino acid residues. In some embodiments, linker 2 between domain 1 and domain 2 wherein linker 1 has at least 6 and no more than 8 amino acid residues. In some embodiments, linker 1 has 3 amino acid residues, and linker 2 has 6, 7, or 8 amino acid residues. In other embodiments, linker 1 has 4 amino acid residues, and linker 2 has 6, 7, or 8 amino acid residues. In further embodiments, linker 1 has 5 amino acid residues, and linker 2 has 6, 7, or 8 amino acid residues. Some embodiments for different combinations of number of amino acid residues in linker 1 and linker 2 are shown in Table 1.

TABLE 1

Number of amino acid residues of linker 1 and linker 2.

| Linker 1 | Linker 2 |
| --- | --- |
| 3 | 6 |
| 3 | 7 |
| 3 | 8 |
| 4 | 6 |
| 4 | 7 |
| 4 | 8 |
| 5 | 6 |
| 5 | 7 |
| 5 | 8 |

In some embodiments, the amino acids of linker 1 and linker 2 may be selected from any amino acids. In some embodiments, linker 1 and linker 2 may be selected from any amino acids except cysteine (C). In other embodiments, linker 1 and linker 2 may be selected from any amino acids except asparagine (N) or aromatic amino acids (phenylalanine, F; tyrosine, Y; tryptophan, W).

In some embodiments, linker 1 has 3 amino acid residues, preferably wherein linker 1 comprises the amino acid sequence XLT or XIT, wherein X may be any amino acid, preferably any one of glycine (G), arginine (r), asparagine (N), alanine (A), proline (P), aspartic acid (D), glutamic acid (E), and threonine (T). In some embodiments, linker 1 has 4 amino acid residues, preferably wherein linker 1 comprises the amino acid sequence GGIX (SEQ ID NO: 19) or GGLX (SEQ ID NO: 20), wherein X may be any one of threonine (T) and serine(S). See Table 4 (Examples) for preferred motifs for linker 1. In certain embodiments, linker 1 comprises the amino acid sequence GGIT, GGLT, RGLT, NGLT, or PTL. In various embodiments of the invention, the amino acid sequence "RTS" (arginine, threonine, serine) is excluded as a linker sequence (or part of a linker sequence) for linker 1.

The amino acid sequence motif of linker 2 may be variable. In some embodiments, the amino acids are selected from the group of A (Ala), G (Gly), P (Pro), V (Val), T (Thr), N (Asn), K (Lys), R (Arg), H (His), E (Glu), M (Met), S (Ser), L (Leu), D (Asp), Q (Gln), I (Ile). In some embodiments, aromatic amino acids (F, W, Y) and cysteine are excluded from linker 2. In specific embodiments, linker 2 comprises of amino acid motifs AKXNPXX, AKTNPGN, AKANPEA, AKRNPMT, ALNSPTS, ASEKGA, ALGNAN, TKRHPKM, TKANPAR, TAANPTA, MNVGKH, VRRVGS, VRTNGA, VRKLGP, VPAGVA, HTPTRG, GTEGVH, IVGGRA, THPEDRQH, PVLRGKP, NRLTKD, VRTEHA, IGASPM (SEQ ID NOs: 86-103).

Structural definition: domain 1 of the Ig binding protein. In some embodiments, the Ig binding protein comprises 17 amino acid residues referred to as domain 1 that has at least 70% sequence identity to SEQ ID NO: 1 or SEQ ID NO: 4 (corresponding to 5 amino acids difference to SEQ ID NO: 1 or corresponding to 5 amino acids difference to SEQ ID NO: 4). In some embodiments, the Ig binding protein comprises domain 1 that has at least 75% sequence identity to SEQ ID NO: 1 or SEQ ID NO: 4 (corresponding to 4 amino acids difference to SEQ ID NO: 1 or corresponding to 4 amino acids difference to SEQ ID NO: 4). In some embodiments, the Ig binding protein comprises domain 1 that has at least 80% sequence identity to SEQ ID NO: 1 or SEQ ID NO: 4 (corresponding to 3 amino acids difference to SEQ ID NO: 1 or corresponding to 3 amino acids difference to SEQ ID NO: 4). In some embodiments, the Ig binding protein comprises domain 1 that has at least 88% sequence identity to SEQ ID NO: 1 or SEQ ID NO: 4 (corresponding to 2 amino acids difference). In some embodiments, the Ig binding protein comprises domain 1 that has at least 94% sequence identity to SEQ ID NO: 1 or SEQ ID NO: 4 (corresponding to 1 amino acid difference).

In some embodiments, the amino acid sequence of domain 1 of the Ig binding protein comprises the sequence of SEQ ID NO: 7, as shown here: $SX_2SX_4X_5X_6LX_8EAX_{11}KLNX_{15}X_{16}Q$, wherein $X_2$ is selected from Q or V; $X_4$ is selected from A, K, or L; $X_5$ is selected from N, E, or A; $X_6$ is selected from L, I, or V; $X_8$ is selected from A or G; $X_{11}$ is selected from K or Q; $X_{15}$ is selected from D or E; and $X_{16}$ is selected from A or S. Specific examples for amino acid sequences of domain 1 are shown in Table 2.

TABLE 2

Amino acid residues of domain 1 of the Ig binding protein

| SEQ ID | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|
| 1 | S | Q | S | A | N | L | L | A | E | A | K | K | L | N | D | A | Q |
| 2 | S | V | S | K | E | I | L | A | E | A | K | K | L | N | D | A | Q |
| 3 | S | Q | S | A | N | L | L | A | E | A | K | K | L | N | E | S | Q |
| 4 | S | V | S | L | E | I | L | A | E | A | K | K | L | N | D | A | Q |
| 5 | S | V | S | L | E | V | L | G | E | A | Q | K | L | N | D | S | Q |
| 6 | S | V | S | L | A | L | L | A | E | A | K | K | L | N | D | A | Q |

Structural definition: domain 2 of the Ig binding protein. In some embodiments, the Ig binding protein comprises 14 amino acid residues referred to as domain 2 that has at least 70% sequence identity to SEQ ID NO: 8 or SEQ ID NO: 9 (corresponding to 4 amino acids difference to SEQ ID NO: 8 or corresponding to 4 amino acids difference to SEQ ID NO: 9). In some embodiments, the Ig binding protein comprises domain 2 that has at least 80% sequence identity to SEQ ID NO: 8 or SEQ ID NO: 9 (corresponding to 3 amino acids difference to SEQ ID NO: 8 or corresponding to 3 amino acids difference to SEQ ID NO: 9). In some embodiments, the Ig binding protein comprises domain 2 that has at least 85% sequence identity to SEQ ID NO: 8 or SEQ ID NO: 9 (corresponding to 2 amino acids difference to SEQ ID NO: 8 or corresponding to 2 amino acids difference to SEQ ID NO: 9). In some embodiments, the Ig binding protein comprises domain 2 that has at least 94% sequence identity SEQ ID NO: 8 or SEQ ID NO: 9 (corresponding to 1 amino acid difference to SEQ ID NO: 8 or corresponding to 1 amino acid difference to SEQ ID NO: 9).

In some embodiments, the amino acid sequence of domain 2 comprises the sequence of SEQ ID NO: 12, as shown here: $EX_2QRNX_6FIQSLX_{12}DD$, wherein $X_2$ is selected from D or E; $X_6$ is selected from G or A; $X_{12}$ is selected from R or K. Examples for amino acid sequences of domain 2 are shown in Table 3.

TABLE 3

Amino acid residues of domain 2 of the Ig binding protein

| SEQ ID NO: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 8 | E | E | Q | R | N | G | F | I | Q | S | L | K | D | D |
| 9 | E | E | Q | R | N | A | F | I | Q | S | L | R | D | D |
| 10 | E | D | Q | R | N | A | F | I | Q | S | L | R | D | D |
| 11 | E | E | Q | R | N | A | F | I | Q | S | L | K | D | D |

Structural definition: domain 3 of the Ig binding protein. In some embodiments, the Ig binding protein comprises 14 amino acid residues referred to as domain 3 that has at least 70% sequence identity to SEQ ID NO: 13 or SEQ ID NO: 15 (corresponding to 4 amino acids difference to SEQ ID NO: 13 or corresponding to 4 amino acids difference to SEQ ID NO: 15). In some embodiments, the Ig binding protein comprises domain 3 that has at least 80% sequence identity to SEQ ID NO: 13 or SEQ ID NO: 15 (corresponding to 3 amino acids difference to SEQ ID NO: 13 or corresponding to 3 amino acids difference to SEQ ID NO: 15). In some embodiments, the Ig binding protein comprises domain 3 that has at least 85% sequence identity to SEQ ID NO: 13 or SEQ ID NO: 15 (corresponding to 2 amino acids difference to SEQ ID NO: 13 or corresponding to 2 amino acids difference to SEQ ID NO: 15). In some embodiments, the Ig binding protein comprises domain 3 that has at least 94% sequence identity SEQ ID NO: 13 or SEQ ID NO: 15 (corresponding to 1 amino acids difference to SEQ ID NO: 13 or corresponding to 1 amino acid difference to SEQ ID NO: 15).

In some embodiments, the amino acid sequence of domain 3 of the Ig binding protein comprises the sequence of SEQ ID NO: 18, as shown here: $X_1X_2X_3X_4QX_6AFYEILX_{13}X_{14}$, wherein $X_1$ is selected from D or N; $X_2$ is selected from K, E; $X_3$ is selected from E, D, A; $X_4$ is selected from Q, A; $X_6$ is selected from N, A; and $X_{13}$ is selected from N, H; $X_{14}$ is selected from M, L. Examples for amino acid sequences of domain 3 are shown in Table 4.

TABLE 4

Amino acid residues of domain 3 of the Ig binding protein

| SEQ ID NO: | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| 13 | N | K | E | Q | Q | N | A | F | Y | E | I | L | H | L |
| 14 | N | K | E | Q | Q | N | A | F | Y | E | I | L | N | M |
| 15 | D | K | D | Q | Q | A | A | F | Y | E | I | L | H | L |
| 16 | D | E | A | Q | Q | A | A | F | Y | E | I | L | H | L |
| 17 | D | E | A | A | Q | A | A | F | Y | E | I | L | H | L |

Structural definition of the Ig binding protein. In some embodiments, an Ig-binding protein is provided wherein domain 1 is selected from SEQ ID NO: 1 (SQSANLLAEAKKLNDAQ), SEQ ID NO: 2 (SVSKEILAEAKKLNDAQ), SEQ ID NO: 3 (SQSANLLAEAKKLNESQ), SEQ ID NO: 4 (SVSLEILAEAKKLNDAQ), SEQ ID NO: 5 (SVSLEVLGEAQKLNDSQ), SEQ ID NO: 6 (SVSLALLAEAKKLNDAQ), or amino acid sequences with at least 85% identity thereto; and domain 2 is selected from SEQ ID NO: 8 (EEQRNGFIQSLKDD), SEQ ID NO: 9 (EEQRNAFIQSLRDD), SEQ ID NO: 10 (EDQRNAFIQSLRDD), SEQ ID NO: 11 (EEQRNAFIQSLKDD), or amino acid sequences with at least 85% identity thereto; and domain 3 is selected from SEQ ID NO: 13 (NKEQQNAFYEILHL), SEQ ID NO: 14 (NKEQQNAFYEILNM), SEQ ID NO: 15 (DKDQQAAFYEILHL), SEQ ID NO: 16 (DEAQQAAFYEILHL), or SEQ ID NO: 17 (DEAAQAAFYEILHL), or amino acid sequences with at least 85% identity thereto.

Some embodiments provide an Ig-binding protein comprising additionally 1, 2, 3, 4, or 5 amino acids at the N-terminus, selected from any amino acid, preferably from the group of A, V, I, D, A, Q, N, A, K, Q, N, F, H. In some embodiments, the N-terminal amino acids of the Ig-binding protein are selected from ADNKF, IAAQH, IAAKF, IAAKH, IAAQF, IDAKF, IDAKH, ADNNF, or VDNKF (SEQ ID NOs: 20-28).

Some embodiments provide an Ig-binding protein comprising additionally 1 or 2 amino acids at the C-terminus, preferably selected from P (Pro) and/or K (Lys).

Preferred Ig binding proteins. In some embodiments, wherein the Ig binding protein comprises or essentially consists of or consists of an amino acid sequence of any of SEQ ID NOs: 31-42, or an amino acid with at least 90%, at least 91%, at least 92%, at least 93%, at least 94%, at least 95%, at least 96%, at least 97%, at least 98%, or at least 99% identity to any of SEQ ID NOs: 31-42. The Ig binding proteins of SEQ ID NOs: 31-42 are three-domain bundles of at least 61 amino acids.

In some embodiments, the Ig binding proteins of the invention may be structurally considered as triple helical proteins, comprising in head-to-tail orientation (a) 1, 2, 3, 4, or 5 N-terminal amino acids; (b) domain 1 (i.e., helix 1) as defined by any one of SEQ ID NO: 1, 2, 3, 4, or 5, or 6; (c) 3, 4, 5 amino acids of linker 1; (d) domain 2 (i.e., helix 2) as defined by any one of SEQ ID NO: 8, 9, 10, or 11; (e) 6, 7, or 8 amino acids of linker 2; (f) domain 3 (i.e., helix 3) as defined by any one of SEQ ID NO: 13, 14, 15, 16, or 17; (g) 1 or 2 C-terminal amino acids.

SEQ ID NO: 51. In some embodiments, the Ig binding proteins of the invention may be structurally considered as triple helical proteins, comprising in head-to-tail orientation (a) 1, 2, 3, 4, or 5 N-terminal amino acids; (b) domain 1 (i.e. helix 1) as defined by SEQ ID NO: 1; (c) 3, 4, 5 amino acids of linker 1; (d) domain 2 (i.e. helix 2) as defined by SEQ ID NO: 8; (e) 6, 7, or 8 amino acids of linker 2; (f) domain 3 (i.e. helix 3) as defined by SEQ ID NO: 13; (g) 1 or 2 C-terminal amino acids.

One embodiment covers an Ig binding protein that the amino acid sequence of SEQ ID NO: 51 or at least 70% identical amino acid sequences thereto. The amino acid sequence of SEQ ID NO: 51 is shown here: $X_1X_2X_3X_4X_5$[SQSANLLAEAKKLNDAQ]$X_{23}X_{24}X_{25}X_{26}X_{27}$[EEQRNGFIQSLKDD]$X_{42}X_{43}X_{44}X_{45}X_{46}X_{47}X_{48}X_{49}$[NKEQQNAFYEILHL]P$X_{65}$, wherein $X_1$ may be any amino acid, preferably selected from alanine (A), valine (V), or isoleucine (I), or absent; $X_2$ may be any amino acid, preferably selected from aspartic acid (D) or alanine (A), or absent; $X_3$ may be any amino acid, preferably selected from asparagine (N) or alanine (A), or absent, $X_4$ may be any amino acid, preferably selected from lysine (K), asparagine (N), or glutamine (Q), or absent; $X_5$ may be any amino acid, preferably selected from phenylalanine (F) or histidine (H), or absent, $X_{23}$-$X_{27}$ correspond to linker 1, wherein $X_{23}$-$X_{25}$ are present and may be any amino acid, preferably any amino acid selected from glycine (G), isoleucine (I), threonine (T), leucine (L), arginine (R), asparagine (N) and proline (P), preferably $X_{23}$ is selected from any of G, R, N, T, and P, $X_{24}$ is selected from any of G and T, $X_{25}$ is selected from any of I, L, and T, $X_{26}$, if present, is selected from any of T and E, $X_{26}$ and/or $X_{27}$ may be present or absent; $X_{42}$-$X_{49}$ correspond to linker 2, wherein $X_{42}$-$X_{47}$ are present and may be any amino acid except aromatic amino acids and cysteine; $X_{48}$ and/or $X_{49}$ may be present or absent; $X_{65}$ may be any amino acid, preferably selected from lysine (K) or proline (P), or absent. Selected examples for amino acid sequences of the Ig binding protein having SEQ ID NO: 51 are the Ig binding proteins shown in SEQ ID NOs: 31, 39-50, 53-71, and as shown in FIG. 1.

SEQ ID NO: 52. In some embodiments, the Ig binding proteins of the invention may be structurally considered as triple helical proteins, comprising in head-to-tail orientation (a) 1, 2, 3, 4, or 5 N-terminal amino acids; (b) domain 1 (i.e. helix 1) as defined by SEQ ID NO: 4; (c) 3, 4, or 5 amino acids of linker 1; (d) domain 2 (i.e. helix 2) as defined by SEQ ID NO: 9; (e) 6, 7, or 8 amino acids of linker 2; (f) domain 3 (i.e. helix 3) as defined by SEQ ID NO: 15; and (g) 1 or 2 C-terminal amino acids.

One embodiment covers an Ig binding protein that the amino acid sequence of SEQ ID NO: 52 or at least 70% identical amino acid sequences thereto. The amino acid sequence of SEQ ID NO: 52 is shown here: $X_1X_2X_3X_4X_5$ [SVSLEILAEAKKLNDAQ]$X_{23}X_{24}X_{25}X_{26}X_{27}X_{28}$[EEQR-NAFIQSLRDD]$X_{42}X_{43}X_{44}X_{45}X_{46}X_{47}X_{48}X_{49}$ [DKDQQAAFYEILHL]P$X_{65}$, wherein $X_1$ may be any amino acid, preferably selected from alanine (A), valine (V), or isoleucine (I), or absent; $X_2$ may be any amino acid, preferably selected from aspartic acid (D) or alanine (A), or absent; $X_3$ may be any amino acid, preferably selected from asparagine (N) or alanine (A), or absent, $X_4$ may be any amino acid, preferably selected from lysine (K), asparagine (N), or glutamine (Q), or absent; $X_5$ may be any amino acid, preferably selected from phenylalanine (F) or histidine (H), or absent, $X_{23}$-$X_{27}$ correspond to linker 1, wherein $X_{23}$-$X_{25}$ are present and may be any amino acid, preferably any amino acid selected from glycine (G), isoleucine (I), threonine (T), leucine (L), arginine (R), asparagine (N) and proline (P), preferably $X_{23}$ is selected from any of G, R, N, and T, $X_{24}$ is selected from any of G and T, $X_{25}$ is selected from any of I, L, or T, $X_{26}$, if present, is selected from any of T and E, $X_{26}$ and/or $X_{27}$ may be present or absent; $X_{42}$-$X_{49}$ correspond to linker 2, wherein $X_{42}$-$X_{49}$ are present and may be any amino acid except aromatic amino acids and cysteine; $X_{48}$ and/or $X_{49}$ may be present or absent; $X_{65}$ may be any amino acid, preferably selected from lysine (K) or proline (P), or absent. An example for an amino acid sequence of an Ig binding protein having SEQ ID NO: 52 is the Ig binding protein shown in SEQ ID NO: 32.

Figure 2:
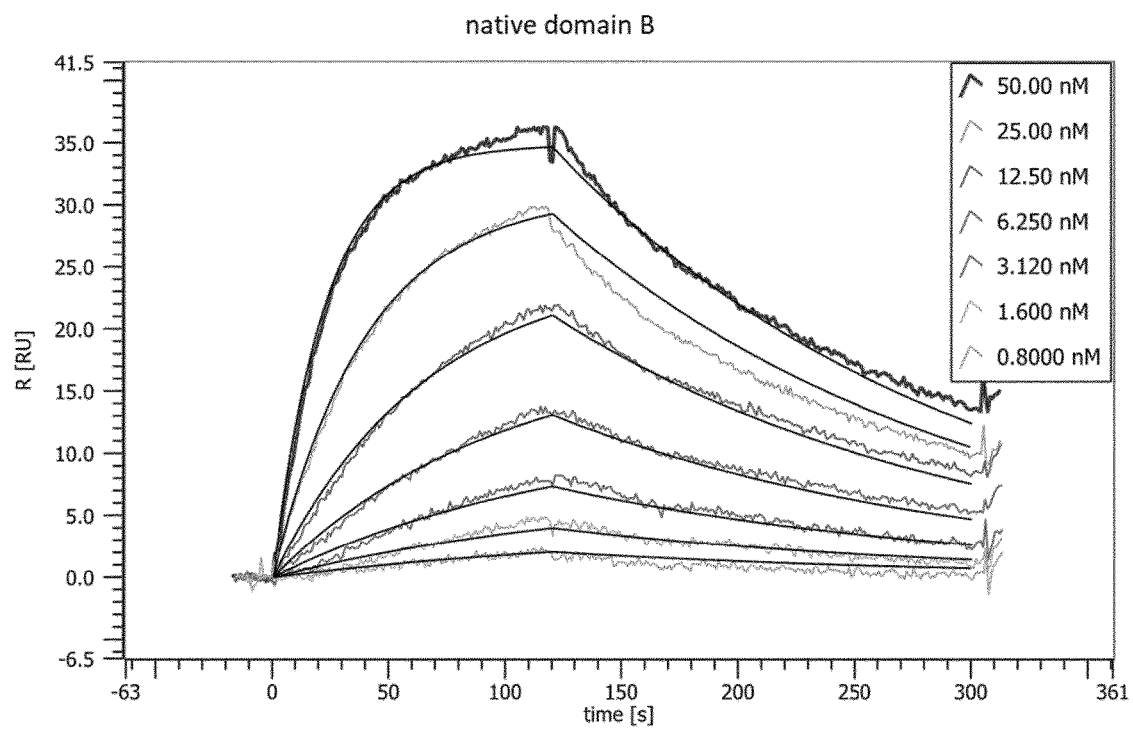
FIG. 2: shows binding to IgG$_1$ Fc region. Analysis via label-free interaction assays using SPR spectroscopy (BIAcore). Change in refractive index measured in real time and plotted as response or resonance unit [RU] versus time [sec].
Figure 2:
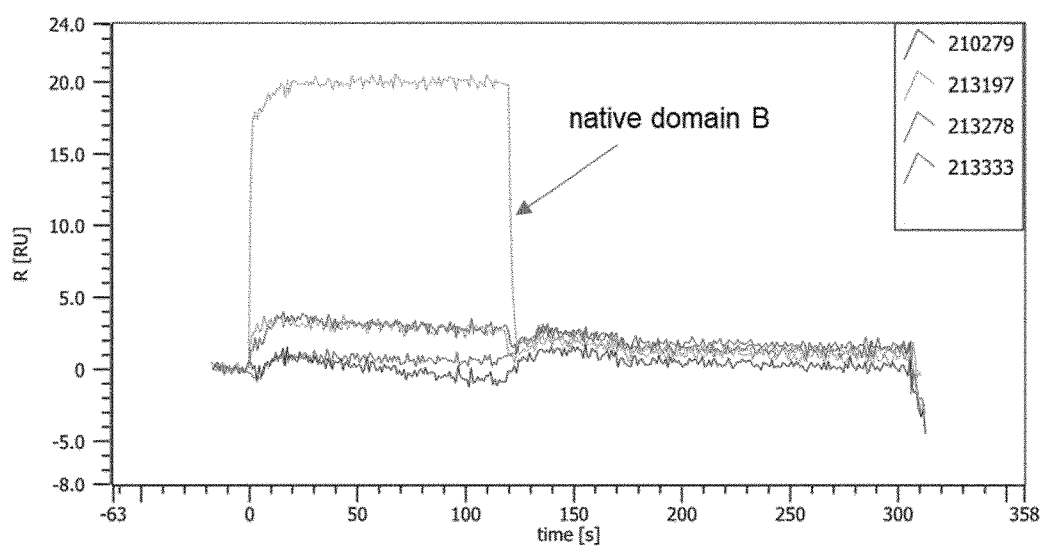

Functional characterization: Affinity to Immunoglobulin. All Ig binding proteins of the invention bind to Immunoglobulin with a dissociation constant $K_D$ preferably below 500 nM, or below 100 nM, even more preferably 10 nM or less. In some embodiments, the Ig binding protein binds to any of $IgG_1$, $IgG_2$, $IgG_4$, IgM, IgA, Ig fragments, Fc fragments, Fab fragments, fusion proteins comprising an Ig region, and conjugates comprising an Ig region with a dissociation constant $K_D$ preferably below 200 nM, or below 100 nM, even more preferably 10 nM or less. Methods for determining binding affinities of Ig binding proteins or domains, i.e. for determining the dissociation constant $K_D$, are known to a person of ordinary skill in the art and can be selected for instance from the following methods known in the art: Surface Plasmon Resonance (SPR) based technology, kinetic exclusion analysis (KinExA assay), Bio-layer interferometry (BLI), enzyme-linked immunosorbent assay (ELISA), flow cytometry, isothermal titration calorimetry (ITC), analytical ultracentrifugation, radioimmunoassay (RIA or IRMA) and enhanced chemiluminescence (ECL). Some of the methods are described further in the Examples. Typically, the dissociation constant $K_D$ is determined at 20° C., 25° C., or 30° C. If not specifically indicated otherwise, the $K_D$ values recited herein are determined at 22° C.+/−3° C. by surface plasmon resonance spectroscopy. In one embodiment, the Ig binding protein has a dissociation constant $K_D$ to human $IgG_1$ in the range between 0.1 nM and 100 nM, preferably between 0.1 nM and 50 nM (see Example 5, Table 5; FIG. 2).

The binding affinity or binding capacity to immunoglobulin may be determined by comparing the loss in Ig binding affinity or binding capacity after alkaline treatment. The Ig binding proteins of the invention retain binding affinity (or binding capacity) for immunoglobulin after exposure to alkaline conditions, in particular exposure to 0.5 M NaOH, more specifically exposure to 0.5 M NaOH for at least 20 h. As further described herein, the Ig binding proteins of the invention retain at least 85% or at least 90% binding affinity for immunoglobulin after exposure to alkaline conditions as described herein. In various embodiments, the Ig binding proteins of the invention retain binding capacity for immunoglobulin as described above when immobilized to a solid support, preferably to a solid support of an affinity separation matrix. As further described herein, the Ig binding affinity is typically determined at room temperature. The term room temperature may include temperatures between 15° C. and 25° C., more specifically temperatures of 20° C. to 25° C., or 22° C.±3° C.

Multimers. In one embodiment, the Ig binding protein comprises 1, 2, 3, 4, 5, or 6, Ig binding proteins linked to each other, i.e. the Ig binding protein can be, for example, a monomer, a dimer, a trimer, a tetramer, a pentamer, or a hexamer. A multimer may comprise two, three, four, or even more binding proteins. Multimers of the invention are fusion proteins generated artificially, generally by recombinant DNA technology well-known to a skilled person. In some embodiments, the multimer is a homo-multimer, e.g. at least two identical Ig binding proteins are fused. A multimer may comprise two or more Ig binding proteins, wherein said Ig binding proteins preferably comprise or essentially consist of a sequence as described above. In some embodiments, the multimer is a hetero-multimer, e.g. at least one Ig binding protein has a different amino acid sequence than the other Ig binding protein(s).

Affinity separation matrix. In another embodiment the present invention is directed to an affinity separation matrix, comprising an Ig binding protein of the previous embodiments. In preferred embodiments, the affinity separation matrix is a solid support. The affinity separation matrix comprises at least one Ig binding protein as described herein. An affinity matrix is useful for separation of immunoglobulins and should retain the Ig binding property even after highly alkaline conditions as applied during cleaning processes. Such cleaning of matrices is essential for long-term repeated use of matrices.

Solid support matrices for affinity chromatography are known in the art and include for example but are not limited to, agarose and stabilized derivatives of agarose (e.g. Praesto® Pure, Praesto® Jetted A50, Mabselect®, PrismA®, Sepharose 6B, CaptivA®, rPROTEIN A Sepharose Fast Flow, and other), cellulose or derivatives of cellulose, controlled pore glass (e.g. ProSep® vA resin), monolith (e.g. CIM® monoliths), silica, zirconium oxide (e.g. CM Zirconia or CPG®), titanium oxide, or synthetic polymers (e.g. polystyrene such as Poros 50A or Poros MabCapture® A resin, polyvinylether, polyvinyl alcohol, monodisperse polyacrylate resin (e.g. UniMab™, UniMab™ Pro), polyhydroxyalkyl acrylates, polyhydroxyalkyl methacrylates, polyacrylamides, polymethacrylamides etc) and hydrogels of various compositions. In certain embodiments the support comprises a polyhydroxy polymer, such as a polysaccharide. Examples of polysaccharides suitable for supports include but are not limited to agar, agarose, dextran, starch, cellulose, pullulan, etc, and stabilized variants of these.

The formats for solid support matrices can be of any suitable well-known kind. Such solid support matrix for coupling the Ig binding protein as described herein might comprise for example, one of the following: columns, capillaries, particles, membranes, filters, monoliths, fibers, pads, gels, slides, plates, cassettes, or any other format commonly used in chromatography and known to someone skilled in the art. In one embodiment, the matrix is comprised of substantially spherical particles, also known as beads, for example Sepharose or Agarose beads or monodisperse polyacrylate beads. Suitable particle sizes may be in the diameter range of 5-500 µm, such as 10-100 µm, such as 20-80 µm, such as 40-70 µm. Matrices in particle form can be used as a packed bed or in a suspended form including expanded beds. In an alternative embodiment, the solid support matrix is a membrane, for example a hydrogel membrane. In some embodiments, the affinity purification involves a membrane as matrix to which the Ig binding protein of the one embodiment is covalently bound. The solid support can also be in the form of a membrane in a cartridge.

In some embodiments, the affinity purification involves a chromatography column containing a solid support matrix to which the Ig binding protein of the one embodiment is covalently bound.

Immobilization to a solid support. In embodiments of the invention, the Ig binding protein is conjugated to a solid support. In some embodiments of the invention, the Ig binding protein may comprise additional amino acid residues at the N- and/or C-terminal end. The Ig binding protein of the invention may be attached to a suitable solid support matrix via conventional coupling techniques. Methods for immobilization of protein ligands to solid supports are well-known in this field and easily performed by the skilled person in this field using standard techniques and equipment. In some embodiments, the coupling may be a multi-point coupling, for example via several lysines, or a single point coupling, for example via cysteine. In some embodiments, the Ig binding protein as described herein comprises an attachment site for covalent attachment to a solid phase (matrix). Site-specific attachment sites comprise natural amino acids, such as cysteine or lysine, which enable specific chemical reactions with a reactive group of the solid phase or a linker between the solid phase and the protein. In some embodiments, the attachment site may be directly at the C- or N-terminal end of the Ig binding protein. In some embodiments, a single cysteine is located at the C-terminal end for site-specific immobilization of the Ig binding protein. An advantage of having a C-terminal cysteine is that coupling of the Ig binding protein can be achieved through reaction of the cysteine thiol with an electrophilic group on a support resulting in a thioether bridge coupling. This provides excellent mobility of the coupled protein which provides increased binding capacity. In other embodiments, there may be an additional amino acid sequence of 3-20 amino acids, preferably of 4-10 amino acids between the N- or C-terminus and the attachment site. Amino acids for a terminal attachment site may be selected from the group of proline, glycine, alanine, and serine, with a single cysteine at the C-terminal end for coupling. In some embodiments of the invention, the Ig binding protein may also comprise additional amino acid residues at the N- and/or C-terminal end, such as for example a leader sequence at the N-terminal end and/or a coupling sequence with or without a tag at the N- or C-terminal end.

Use of the Ig binding protein in affinity purification. In a one embodiment the present invention is directed to the use of the Ig binding protein as described herein or an affinity matrix as described above for affinity purification of immunoglobulins thereof, i.e. the Ig binding protein of the invention is used for affinity chromatography. In some embodiments, the Ig binding protein of the invention is immobilized onto a solid support as described in the one embodiment of the invention.

Method of affinity purification of immunoglobulins. In one embodiment the present invention is directed to a method of affinity purification of immunoglobulins, the method comprising the following steps: (a) providing a liquid that contains an Ig such as $IgG_1$, $IgG_2$, $IgG_4$, IgM, IgA, Ig fragments, Fc fragments, or Fab fragments (including fusion proteins and conjugates, as defined above); (b) providing an affinity separation matrix comprising an immobilized Ig binding protein as described above immobilized to said affinity separation matrix; (c) contacting said liquid with said affinity separation matrix, under conditions that permit binding of the at least one Ig binding protein as described above to an Ig; and (d) eluting said Ig from said matrix, thereby obtaining an eluate containing said Ig.

In some embodiments, the method of affinity purification may further comprise one or more washing steps carried out between steps (c) and (d) under conditions sufficient to remove from the affinity separation matrix some or all molecules that are non-specifically bound thereto. Non-specifically bound means any binding that does not involve an interaction between the at least one Ig binding protein and an Ig.

Affinity separation matrices suitable for the disclosed uses and methods are those matrices according to the embodiments described above and as known to someone skilled in the art.

In some embodiments, the elution of the immunoglobulin from Ig binding protein in step (d) is effected through a change in pH and/or a change in salt concentration. In general, suitable conditions for performing the method of affinity purification are well known to someone skilled in the art. In some embodiments, the disclosed uses or methods of affinity purification comprising the disclosed Ig binding proteins may provide elution of at least about 90%, at least about 95%, at least about 96%, at least about 97%, at least about 98%, at least about 99%, or 100% of Ig containing proteins at a pH of greater than or equal to 3.5 (e.g., about 3.8, about 4.0, or about 4.5). Due to the high stability of the Ig binding proteins of the invention, solutions with greater than or equal to pH 3.5 can be used for the elution of Ig proteins.

In some embodiments, in step (d) of the method of affinity purification more than 95% of the protein comprising the Ig sequence (e.g. antibody) is eluted at pH 3.7 or higher (up to about pH 5.5) from the matrix comprising the immobilized Ig binding protein or Ig binding domain as described above. In some embodiments, a further step (e) for efficient cleaning of the affinity matrix is added, preferably by using an alkaline liquid, for example, with pH of 13-14. In certain embodiments, the cleaning liquid comprises 0.1-1.0 M NaOH or KOH, preferably 0.25-0.5 M NaOH or KOH.

In some embodiments, the affinity matrix can be re-used at least 10 times, at least 20 times, at least 30 times, at least 40 times, at least 50 times, at least 60 times, at least 70 times, at least 80 times, at least 90 times, or at least 100 times, due to a repetition of steps (a) to (e), optionally (a) to (f) can be repeated at least 10 times, at least 20 times, at least 30 times, at least 40 times, at least 50 times, at least 60 times, at least 70 times, at least 80 times, at least 90 times, or at least 100 times.

In various embodiments, the disclosed uses or methods of affinity purification comprising the disclosed Ig binding proteins or Ig binding domains may provide elution of at least about 95%, at least about 96%, at least about 97%, at least about 98%, at least about 99%, or 100% of Ig containing proteins at a pH of greater than or equal to pH 3.7 (e.g., about pH 4.0 or higher, about pH 4.5 or higher, about pH 5.0, or up to about pH 5.5). In accordance with the invention, solutions (eluates) with greater than or equal to pH 3.7 can be used for the elution of Ig proteins. In various embodiments, the elution may be carried out at mild acidic conditions in the range of pH 4.0 up to and including pH 5.5. In various other embodiments, the elution may be carried out under acidic conditions of pH 4.2 or 4.3 or higher, preferably at pH 4.5 or higher, more preferably at acidic conditions of any of pH 4.2, 4.3, and 4.5 up to and including pH 5.5.

The present invention further provides a method of isolating an immunoglobulin, comprising the steps (a) contacting a liquid sample comprising an immunoglobulin with a separation matrix comprising a plurality of Ig binding proteins or Ig binding domains (coupled to a solid support); (b) washing the separation matrix with a washing liquid at a pH above pH 3.7 (up to pH 5.5, including the preferred pH values and ranges described elsewhere herein); (c) eluting the immunoglobulin from the separation matrix; and (d) obtaining the immunoglobulin.

Nucleic acid molecule. In one embodiment, the present invention is directed to a nucleic acid molecule, preferably an isolated nucleic acid molecule, encoding an Ig binding protein as disclosed above. In one embodiment, the present invention is directed to a vector comprising the nucleic acid molecule. A vector means any molecule or entity (e.g., nucleic acid, plasmid, bacteriophage or virus) that can be used to transfer protein coding information into a host cell. In one embodiment, the vector is an expression vector.

In one embodiment, the present invention is directed to an expression system which comprises a nucleic acid or a vector as disclosed above, for example a prokaryotic host cell, for example E. coli, or a eukaryotic host, for example yeast Saccharomyces cerevisiae or Pichia pastoris or mammalian cells such as CHO cells.

Method for the production of an Ig binding protein. In one embodiment the present invention is directed to a method for the production of a Ig binding protein of the invention, comprising the step(s): (a) culturing the host cell of the one embodiment under suitable conditions for the expression of the binding protein in order to obtain said Ig binding protein; and (b) optionally isolating said Ig binding protein. Suitable conditions for culturing a prokaryotic or eukaryotic host are well-known to the person skilled in the art.

Ig binding molecules of the invention may be prepared by any of the many conventional and well-known techniques such as plain organic synthetic strategies, solid phase-assisted synthesis techniques or by commercially available automated synthesizers. On the other hand, they may also be prepared by conventional recombinant techniques alone or in combination with conventional synthetic techniques.

One embodiment of the present invention is directed to a method for the preparation of a Ig binding protein according to the invention as detailed above, said method comprising the following steps: (a) preparing a nucleic acid encoding an Ig binding protein as defined above; (b) introducing said nucleic acid into an expression vector; (c) introducing said expression vector into a host cell; (d) cultivating the host cell; (e) subjecting the host cell to culturing conditions under which an Ig binding protein is expressed, thereby (e) producing an Ig binding protein as described above; optionally (f) isolating the protein produced in step (e); and (g) optionally conjugating the protein to solid matrices as described above.

In a further embodiment of the present invention the production of the Ig binding protein is performed by cell-free in vitro transcription/translation.

EXAMPLES

The following Examples are provided for further illustration of the invention. The invention, however, is not limited thereto, and the following Examples merely show the practicability of the invention on the basis of the above description.

Example 1. Selection of Ig Binding Proteins

Libraries based on scaffold sequences of three-domain proteins as defined by SEQ ID NOs: 43-50, comprising 3, 4, or 5 randomized amino acid positions as linker 1 and 6, 7, or 8 randomized amino acid positions as linker 2 were synthesized in house by randomized oligonucleotides generated by synthetic trinucleotide phosphoramidites (Microsynth Seqlab) to achieve a well-balanced amino acid distribution with simultaneously exclusion of cysteine and aromatic amino acid residues at randomized positions. For the following selection process by ribosome display, the cDNA libraries were supplemented with a T7 promoter region at the 5' end and a spacer region at the 3' end, respectively. Unless otherwise indicated, established recombinant genetic methods were used. The cDNA libraries including the ribosome display regulatory elements were each transcribed into the corresponding RNA library followed by in vitro translation into a protein library. Those generated mRNA-ribosome-protein-ternary complexes were stable and thus suitable for selection. The ternary complexes were allowed to bind the biotinylated target (hIgG1-Fc) while the target was immobilized on magnetic beads. Target concentration started at 200 nM (round 1) and declined each round to 10 nM (round 4). Selected pools of round 3 and 4 were amplified by PCR according to methods known in the art, cut with appropriate restriction nucleases and ligated into a derivative of the expression vector pNP-013 comprising an N-terminal sfGFP-10×His-TVMV cleavage site and a C-terminal cysteine. To identify target specific pools, pools of round 3 and 4 were analyzed by pool ELISA. Therefore, subcloned pools were transformed in E. coli BL21 (DE3), cultivated in 5 ml autoinduction media. The cells were harvested and lysed by three freeze/thaw cycles. Wells of a high binding microtiter plate (Greiner Bio-One) were coated with hIgG1-Fc (2.5 µg/ml). Lysates were allowed to bind the target followed by several washing steps. Bound variants were detected via fluorescence signal. All selection pools showed specific binding to the unmodified (non-biotinylated) hIgG$_1$-Fc and proceeded to high throughput screening.

Example 2. High-Throughput Screening

To identify target specific proteins, single variants were analyzed by ELISA. Subcloned pools were transformed in E. coli BL21 (DE3). Cells were spread onto selective agar plates (Kanamycin) and incubated overnight at 31° C. Single colonies were picked and cultivated in 384-well format. Colonies were inoculated in 60 µl 2×YT medium supplemented with 50 µg/ml kanamycin and cultured for 17 hours at 37° C. at 800 rpm in an orbital shaker. Main cultures were inoculated from previous overnight culture and cells were grown for 5 hours at 37° C. and 12 hours at 30° C. at 800 rpm. The cells were harvested and lysed by freeze/thaw cycles. Wells of a high binding microtiter plate (Greiner Bio-One) were coated with hIgG$_1$-Fc (2.5 µg/ml). Lysates were allowed to bind the target followed by several washing steps. Bound variants were detected via fluorescence signal. Proteins with specific binding to the unmodified (non-biotinylated) hIgG$_1$-Fc were proceeded to sequencing, expression and purification.

Example 3. Sequence Analysis of Ig Binding Proteins 112 amino acid sequences with Immunoglobulin binding were analysed. About 80% of the sequences showed specific motifs for linker 1: (XLT), x=G, P, A, D, E, T; (GGIX) und (GGLX) X=T, S (SEQ ID NO: 19, SEQ ID NO: 20). Selected motifs for linker 1 are shown in Table 5:

TABLE 5

Selected linker motifs for linker 1

| linker 1 | amount | percent (%) |
|---|---|---|
| PLT | 16 | 14.29 |
| GGLT | 13 | 11.61 |
| GGIT | 9 | 8.04 |
| GLT | 8 | 7.14 |
| ALT | 7 | 6.25 |
| DLT | 5 | 4.46 |
| ELT | 5 | 4.46 |
| TLT | 5 | 4.46 |
| GGLS | 4 | 3.57 |

Further exemplary Ig binding proteins of the invention have the motif RGLT, NGLT, or GRLT. Variants with a motif "RTS" do not bind to immunoglobulin (SEQ ID NOs: 72-80). Variants having only domain 2 and domain 3 (but missing domain 1 and linker 1) do not bind to immunoglobulin (SEQ ID NOs: 81, 82).

Example 4. Expression of Ig Binding Proteins

BL21 (DE3) competent cells were transformed with an expression plasmid encoding Ig binding proteins. Cells were spread onto selective agar plates (Kanamycin) and incubated overnight at 37° C. Precultures were inoculated from single colony in 50 ml 2×YT medium supplemented with 50 μg/ml kanamycin and cultured for 17 hours at 37° C. at 200 rpm in a conventional orbital shaker in 500 ml Erlenmeyer flasks. The $OD_{600}$ readout should be in the range of 4-6. Main cultures were inoculated from previous overnight culture with an adjusted start-$OD_{600}$ of 0.3 in 300 ml superrich medium (modified H15 medium consisting of 2% glucose, 5% yeast extract, 0.89% glycerol, 0.76% lactose, 250 mM MOPS, 202 mM TRIS, 10 mM $MgSO_4$, pH 7.4, antifoam SE15) that was supplemented with 50 μg/ml Kanamycin and trace elements in 1 L thick-walled Erlenmeyer flasks. Cultures were transferred to a resonant acoustic mixer ($RAM_{bio}$) and incubated at 37° C. with 20×g. Aeration was facilitated by Oxy-Pump stoppers. Recombinant protein expression was induced by metabolizing glucose and subsequently allowing lactose to enter the cells. Cells were grown overnight for approx. 18 hours to reach a final $OD_{600}$ of about 30-45. Before the harvest, the $OD_{600}$ was measured, samples adjusted to 0.6/$OD_{600}$ were withdrawn, pelleted and frozen at −20° C. To collect biomass cells were centrifuged at 12000×g for 15 min at 20° C. Pellets were weighed (wet weight). Cells were stored at −20° C. before processing.

Example 5. SDS-PAGE Analysis of Expression and Solubility of Ig Binding Proteins of the Invention Samples were resuspended in 90 μl extraction buffer (PBS supplemented with 0.2 mg/ml Lysozyme, 0.5× BugBuster, 6 mM $MgSO_4$, 6 mM $MgCl_2$, 15 U/mL Benzonase) and solubilized by agitation in a thermomixer at 850 rpm, rt for 15 min with a subsequent incubation at −80° C. for 15 min. After thawing, soluble proteins were separated from insoluble proteins by centrifugation (16000×g, 2 min, rt). Supernatant was withdrawn (soluble fraction) and the pellet (insoluble fraction) was resuspended in equivalent amount of urea buffer (8 M urea, 0.2 M Tris, 20 mM EDTA, pH 7.0). 35 μl were taken both from the soluble and insoluble fraction, and 10 μl 5× sample buffer as well as 5 μl 0.5 M DTT were added. Samples were boiled at 95° C. for 5 min. Finally, 5 μl of those samples were applied to NuPage Novex 4-12% Bis-Tris SDS gels which were run in accordance to the manufacturer's recommendations and stained with Coomassie. High level expression of all Ig binding proteins was found under optimized conditions within the chosen period of time (data not shown). All expressed Ig binding proteins were soluble as determined by SDS-PAGE.

Example 6. Purification of Ig Binding Proteins of the Invention

Ig binding proteins were expressed in the soluble fraction of E. coli. The cells were resuspended in cell disruption buffer and lysed by an ultrasonic cell disruption system (Sonopuls HD 2200, Bandelin). Purification step was performed with nickel-charged IMAC resin (GE Healthcare) using an Äkta Xpress System (GE Healthcare) according to the manufacturer's instructions. Pure protein fractions were eluted by increasing imidazole concentration to 0.5 M. To generate Tag-free proteins TVMV cleavage was performed over night at room temperature. Tag-free proteins were purified by reverse IMAC with nickel-charged resin (GE Healthcare) using an Äkta Xpress System (GE Healthcare) according to the manufacturer's instructions. Pure protein fractions were collected in the flow through.

Example 7. The Ig Binding Proteins of the Invention Bind to IgG with High Affinities (as Determined with Surface Plasmon Resonance Experiments)

A CM5 sensor chip (GE Healthcare) was equilibrated with SPR running buffer. Surface-exposed carboxylic groups were activated by passing a mixture of EDC and NHS to yield reactive ester groups. 700-1500 RU on-ligand were immobilized on a flow cell, off-ligand was immobilized on another flow cell. Injection of ethanolamine after ligand immobilization removes non-covalently bound Ig binding protein. Upon ligand binding, protein analyte was accumulated on the surface increasing the refractive index. This change in the refractive index was measured in real time and plotted as response or resonance units (RU) versus time. The analytes were applied to the chip in serial dilutions with a suitable flow rate (μl/min). After each run, the chip surface was regenerated with regeneration buffer and equilibrated with running buffer. The control samples were applied to the matrix. Regeneration and re-equilibration were performed as previously mentioned. Binding studies were carried out by the use of the Biacore® 3000 (GE Healthcare) at 25° C.; data evaluation was operated via the BIAevaluation 3.0 software, provided by the manufacturer, by the use of the Langmuir 1:1 model (RI=0). Evaluated dissociation constants ($K_D$) were standardized against off-target and $K_D$ values of different artificial Ig binding proteins for hIgG1-Fc (FIG. 2 and TABLE 6). For example, the KD of SEQ ID NO: 41 (CID208846) and SEQ ID NO: 42 (CID208847) is in single-digit μM range vs. hIgG1-Fc. Further, binding to hIgG1-Fc was confirmed for all variants including CID-213276, CID-213213, CID-210240, CID-210234. Further data are shown in Table 6.

TABLE 6

Affinity to hIgG1-Fc
(selected Ig binding proteins of the invention).

| CID | Linker 1 | Linker 2 | KD hIgG$_1$-Fc (nM) |
|---|---|---|---|
| 213333 | GGIT | AKTNPGN | 43 |
| 213278 | GGLT | MNVGKH | 199 |
| 213246 | GGLT | VRRVGS | 248 |
| 213235 | RGLT | TKRHPKM | 257 |
| 213224 | NGLT | VRTNGA | 220 |
| 213215 | GGLT | VRKLGP | 190 |
| 213197 | GGLT | TAANPTA | 84 |
| 213191 | GGLT | GTEGVH | 132 |
| 210279 | GGLT | THPEDRQH | 103 |
| 210259 | GGIT | AKRNPMT | 507 |

No binding of Ig binding proteins to Avelumab Fab (c=5 μM) was observed (see FIG. 3). Native Domain B shows high affinity binding to Avelumab Fab.

Example 8: Competitive ELISA

The target hIgG-Fc (5 μg/mL) was immobilized overnight at 4° C. on 384-well high-binding plates (Greiner Bio-One). All subsequent washing and incubation steps were performed at room temperature. After immobilization, plates were washed three times with PBST 0.1% and blocking with 110 μL per well 3% BSA in PBST 0.1% was performed for 2 hours to reduce unspecific binding. Starting from a protein concentration of 10 μM, a dilution series of tag free recombinant domain B proteins up to 10 nM in PBST 0.1% was produced. Recombinant proteins were mixed with an additional antigen (Strep-tagged native domain B, 100 nM). 20 μL of each dilution was pipetted in the individual wells and incubated for 1 hour. Unbound protein was removed from the microtiter plate by washing three times with PBST 0.1%. 20 μL per well Streptactin-HRP conjugate (diluted 1:10.000 in PBST 0.1%) was added and the plate was incubated for 1 hour. A three times washing step with PBST 0.1% was followed by a further three times washing step with 1×PBS. After washing, 20 μL per well the peroxidase substrate TMB Plus was added. The substrate conversion was stopped after 30 minutes by addition of 20 μL per well of 0.2 M H$_2$SO$_4$. The detection was performed in a microplate reader at 450 nm against a reference wavelength of 620 nm. Results: Ig binding proteins of the invention compete with native domain B for hIgG-Fc binding; see FIG. 4.

Example 9: CD Spectroscopy

The far UV CD measurements were performed with a Jasco J-810 spectropolarimeter. Proteins solutions with a concentration of 0.5-1 mg/mL were transferred in a quartz cuvette (0.1 mm Suprasil 106-QS). The measurement was performed at 20° C. within the wavelengths of 190-250 nm. A speed of 50 nm/min with a bandwidth of 1 nm was set. The mean value from 16 measured spectra was determined and corrected against the reference buffer. The mean residual ellipticity and the secondary structure proportions were calculated with the device software according to the reference by Yang (Yang 1986). Results: Ig binding proteins spectra are determined by alpha-helical species; see FIG. 5.

Example 10. Ig Binding Proteins Coupled to Agarose-Based Chromatography Beads Praesto™ Pure85-Elution pH Screen in μ-Scale Format Purified Ig binding proteins of the invention were coupled to agarose-based chromatography beads (Praesto™ Pure85, Purolite; Cat. No. PR01265-164) according to the manufacturer's instructions (coupling conditions: pH 9.5, 3 hours, 25° C., 4.1 M NaSO$_4$, blocking overnight with 1 M ethanolamine). Result: CID-213215 coupling density 2.4 mg protein per ml resin (compared to 1.7 mg protein per ml resin domain B); the coupling density of CID-210279 was comparable to domain B. The coupled resin was transferred in a 96-well fritted plate. Polyclonal human IgG Gammanorm® (Ocatpharm) was used as IgG sample (6 mg/well). Polyclonal hIgG sample was applied in saturated amounts to the matrix comprising immobilized Ig binding protein. Elution cycles in 0.5 pH steps with 50 mM citrate buffer from pH 6.4 to 2.0 were performed and the concentration of eluted protein was determined by absorption measurement at 280 nm. Result: Elution of IgG from immobilized affinity ligands of the invention is surprising at higher pH (pH 5.2-4.6) than native domain B. Results see FIG. 6.

The invention claimed is:

1. An immunoglobulin (Ig)-binding protein comprising the following general structure from N- to C-terminus: domain 1-linker 1-domain 2-linker 2-domain 3, wherein:
   (i) domain 1 comprises an amino acid sequence, which is at least 70% identical to the amino acid sequence of SEQ ID NO: 1 (SQSANLLAEAKKLNDAQ) or to SEQ ID NO: 4 (SVSLEILAEAKKLNDAQ);
   (ii) linker 1 has at least 3 and no more than 5 amino acid residues, and further wherein linker 1 comprises the amino acid sequence:
      (a) $X_1$LT or $X_1$IT, wherein $X_1$ is selected from the group consisting of glycine (G), arginine (R), asparagine (N), proline (P), alanine (A), aspartic acid (D), glutamic acid (E), and threonine (T); or
      (b) GGI$X_2$ (SEQ ID NO: 19) or GGL$X_2$ (SEQ ID NO: 20), wherein $X_2$ is selected from the group consisting of threonine (T) and serine(S); or
      (c) GG$X_3$LT (SEQ ID NO: 83), wherein $X_3$ is selected from the group consisting threonine (T) and serine (S); or
      (d) $X_4$GLT (SEQ ID NO: 84), wherein $X_4$ is selected from the group consisting of arginine (R) and glycine (G) and asparagine (N); or
      (e) G$X_5$LT (SEQ ID NO: 85), wherein $X_5$ is selected from the group consisting of arginine (R) and glycine (G) and asparagine (N); or
      (f) an amino acid sequence selected from the group consisting of GGITT (SEQ ID NO: 106), NGLT (SEQ ID NO: 107), RGLT (SEQ ID NO: 108), GRLT (SEQ ID NO: 109), and PTL;
   (iii) domain 2 comprises an amino acid sequence, which is at least 70% identical to the amino acid sequence of SEQ ID NO: 8 (EEQRNGFIQSLKDD) or to SEQ ID NO: 9 (EEQRNAFIQSLRDD);
   (iv) linker 2 has at least 6 and no more than 8 amino acid residues; and
   (v) domain 3 comprises an amino acid sequence, which is at least 70% identical to the amino acid sequence of SEQ ID NO: 13 (NKEQQNAFYEILHL) or to SEQ ID NO: 15 (DKEQQAAFYEILHL).

2. The Ig-binding protein according to claim 1, wherein linker 1 has 3 amino acid acids.

3. The Ig-binding protein according to claim 1, wherein:
   (i) domain 1 is selected from the group consisting of SEQ ID NO: 1 (SQSANLLAEAKKLNDAQ), SEQ ID NO: 2 (SVSKEILAEAKKLNDAQ), SEQ ID NO: 3 (SQSANLLAEAKKLNESQ), SEQ ID NO: 4 (SVSLEILAEAKKLNDAQ), SEQ ID NO: 5 (SVSLEVLGEAQKLNDSQ), SEQ ID NO: 6 (SVSLALLAEAKKLNDAQ), and amino acid sequences with at least 85% identity thereto;
   (ii) domain 2 is selected from the group consisting of SEQ ID NO: 8 (EEQRNGFIQSLKDD), SEQ ID NO: 9 (EEQRNAFIQSLRDD), SEQ ID NO: 10 (EDQRNAFIQSLRDD), SEQ ID NO: 11 (EEQRNAFIQSLKDD), and amino acid sequences with at least 85% identity thereto; and
   (iii) domain 3 is selected from the group consisting of SEQ ID NO: 13 (NKEQQNAFYEILHL), SEQ ID NO: 14 (NKEQQNAFYEILNM), SEQ ID NO: 15 (DKDQQAAFYEILHL), SEQ ID NO: 16 (DEAQQAAFYEILHL), SEQ ID NO: 17 (DEAAQAAFYEILHL), and amino acid sequences with at least 85% identity thereto.

4. The Ig-binding protein according to claim 1, further comprising 1, 2, 3, 4, or 5 amino acids added to the N-terminus of domain 1, optionally wherein the 1, 2, 3, 4, or 5 amino acids are selected from the group consisting of alanine (A), valine (V), isoleucine (I), aspartate (D), glutamate (Q), asparagine (N), lysine (K), phenylalanine (F), and histidine (H).

5. The Ig-binding protein according to claim 1, further comprising 1 or 2 amino acids added to the C-terminus of domain 3, optionally wherein the 1 or 2 amino acids added to the C-terminus of domain 3 are selected from the group consisting of proline (P) and lysine (K).

6. The Ig-binding protein according to claim 1, wherein the Ig-binding protein comprises the amino acid sequence of any of SEQ ID NOs: 31-71, or amino acid sequences with 85% identity thereto.

7. The Ig-binding protein according to claim 1, wherein the Ig-binding protein comprises 2, 3, 4, 5, or 6 Ig-binding proteins linked to each other.

8. The Ig-binding protein according to claim 1, wherein said protein binds to $IgG_1$, $IgG_2$, $IgG_4$, IgM, IgA, Ig fragments, Fc fragments, or Fab fragments.

9. The Ig-binding protein according to claim 1, wherein the Ig-binding protein is immobilized to a solid support.

10. An affinity separation matrix comprising an Ig-binding protein of claim 1.

11. A method for affinity purifying a protein comprising an Ig sequence, the method comprising:
   (a) providing a liquid that contains a protein comprising an Ig sequence;
   (b) providing an affinity separation matrix comprising an Ig-binding protein of claim 1;
   (c) contacting said affinity separation matrix with the liquid under conditions that permit binding of the at least one Ig-binding protein of claim 1 to the protein comprising the Ig sequence present in the liquid; and
   (d) eluting said protein comprising the Ig sequence from said affinity purification matrix.

12. The method of claim 11, wherein the contacting is under acidic conditions of pH 4.2 or higher, optionally pH 4.2-5.5.

13. The Ig-binding protein according to claim 1, wherein linker 1 has 4 amino acid residues.

14. The Ig-binding protein according to claim 1, wherein linker 1 has 5 amino acid residues.

\* \* \* \* \*

SEQUENCE LISTING

<160> NUMBER OF SEQ ID NOS: 103

<210> SEQ ID NO 1
<211> LENGTH: 17
<212> TYPE: PRT
<213> ORGANISM: Artificial Sequence
<220> FEATURE:
<223> OTHER INFORMATION: Artificially synthesized domain 1 of Ig binding protein

<400> SEQUENCE: 1

Ser Gln Ser Ala Asn Leu Leu Ala Glu Ala Lys Lys Leu Asn Asp Ala
1               5                   10                  15
Gln

<210> SEQ ID NO 2
<211> LENGTH: 17
<212> TYPE: PRT
<213> ORGANISM: Artificial Sequence

```
<220> FEATURE:
<223> OTHER INFORMATION: Artificially synthesized domain 1 of Ig binding
      protein

<400> SEQUENCE: 2

Ser Val Ser Lys Glu Ile Leu Ala Glu Ala Lys Lys Leu Asn Asp Ala
1               5                   10                  15

Gln

<210> SEQ ID NO 3
<211> LENGTH: 17
<212> TYPE: PRT
<213> ORGANISM: Artificial Sequence
<220> FEATURE:
<223> OTHER INFORMATION: Artificially synthesized domain 1 of Ig binding
      protein

<400> SEQUENCE: 3

Ser Gln Ser Ala Asn Leu Leu Ala Glu Ala Lys Lys Leu Asn Glu Ser
1               5                   10                  15

Gln

<210> SEQ ID NO 4
<211> LENGTH: 17
<212> TYPE: PRT
<213> ORGANISM: Artificial Sequence
<220> FEATURE:
<223> OTHER INFORMATION: Artificially synthesized domain 1 of Ig binding
      protein

<400> SEQUENCE: 4

Ser Val Ser Leu Glu Ile Leu Ala Glu Ala Lys Lys Leu Asn Asp Ala
1               5                   10                  15

Gln

<210> SEQ ID NO 5
<211> LENGTH: 17
<212> TYPE: PRT
<213> ORGANISM: Artificial Sequence
<220> FEATURE:
<223> OTHER INFORMATION: Artificially synthesized domain 1 of Ig binding
      protein

<400> SEQUENCE: 5

Ser Val Ser Leu Glu Val Leu Gly Glu Ala Gln Lys Leu Asn Asp Ser
1               5                   10                  15

Gln

<210> SEQ ID NO 6
<211> LENGTH: 17
<212> TYPE: PRT
<213> ORGANISM: Artificial Sequence
<220> FEATURE:
<223> OTHER INFORMATION: Artificially synthesized domain 1 of Ig binding
      protein

<400> SEQUENCE: 6

Ser Val Ser Leu Ala Leu Leu Ala Glu Ala Lys Lys Leu Asn Asp Ala
1               5                   10                  15

Gln

<210> SEQ ID NO 7
<211> LENGTH: 17
<212> TYPE: PRT
```

```
<213> ORGANISM: Artificial Sequence
<220> FEATURE:
<223> OTHER INFORMATION: Artificially synthesized domain 1 of Ig binding
      protein (consensus)
<220> FEATURE:
<221> NAME/KEY: Xaa
<222> LOCATION: (2)..(2)
<223> OTHER INFORMATION: Xaa may be selected from Q or V
<220> FEATURE:
<221> NAME/KEY: Xaa
<222> LOCATION: (4)..(4)
<223> OTHER INFORMATION: Xaa may be selected from A, K, or L
<220> FEATURE:
<221> NAME/KEY: Xaa
<222> LOCATION: (5)..(5)
<223> OTHER INFORMATION: Xaa may be selected from N, E, or A
<220> FEATURE:
<221> NAME/KEY: Xaa
<222> LOCATION: (6)..(6)
<223> OTHER INFORMATION: Xaa may be selected from L, I, or V
<220> FEATURE:
<221> NAME/KEY: Xaa
<222> LOCATION: (8)..(8)
<223> OTHER INFORMATION: Xaa may be selected from A or G
<220> FEATURE:
<221> NAME/KEY: Xaa
<222> LOCATION: (11)..(11)
<223> OTHER INFORMATION: Xaa may be selected from K or Q
<220> FEATURE:
<221> NAME/KEY: Xaa
<222> LOCATION: (15)..(15)
<223> OTHER INFORMATION: Xaa may be selected from D or E
<220> FEATURE:
<221> NAME/KEY: Xaa
<222> LOCATION: (16)..(16)
<223> OTHER INFORMATION: Xaa may be selected from S or A

<400> SEQUENCE: 7

Ser Xaa Ser Xaa Xaa Xaa Leu Xaa Glu Ala Xaa Lys Leu Asn Xaa Xaa
1               5                   10                  15

Gln

<210> SEQ ID NO 8
<211> LENGTH: 14
<212> TYPE: PRT
<213> ORGANISM: Artificial Sequence
<220> FEATURE:
<223> OTHER INFORMATION: Artificially synthesized domain 2 of Ig binding
      protein

<400> SEQUENCE: 8

Glu Glu Gln Arg Asn Gly Phe Ile Gln Ser Leu Lys Asp Asp
1               5                   10

<210> SEQ ID NO 9
<211> LENGTH: 14
<212> TYPE: PRT
<213> ORGANISM: Artificial Sequence
<220> FEATURE:
<223> OTHER INFORMATION: Artificially synthesized domain 2 of Ig binding
      protein

<400> SEQUENCE: 9

Glu Glu Gln Arg Asn Ala Phe Ile Gln Ser Leu Arg Asp Asp
1               5                   10

<210> SEQ ID NO 10
<211> LENGTH: 14
<212> TYPE: PRT
<213> ORGANISM: Artificial Sequence
<220> FEATURE:
<223> OTHER INFORMATION: Artificially synthesized domain 2 of Ig binding
```

-continued

```
        protein

<400> SEQUENCE: 10

Glu Asp Gln Arg Asn Ala Phe Ile Gln Ser Leu Arg Asp Asp
1               5                   10

<210> SEQ ID NO 11
<211> LENGTH: 14
<212> TYPE: PRT
<213> ORGANISM: Artificial Sequence
<220> FEATURE:
<223> OTHER INFORMATION: Artificially synthesized domain 2 of Ig binding
      protein

<400> SEQUENCE: 11

Glu Glu Gln Arg Asn Ala Phe Ile Gln Ser Leu Lys Asp Asp
1               5                   10

<210> SEQ ID NO 12
<211> LENGTH: 14
<212> TYPE: PRT
<213> ORGANISM: Artificial Sequence
<220> FEATURE:
<223> OTHER INFORMATION: Artificially synthesized domain 2 of Ig binding
      protein (consensus)
<220> FEATURE:
<221> NAME/KEY: Xaa
<222> LOCATION: (2)..(2)
<223> OTHER INFORMATION: Xaa may be selected from E or D
<220> FEATURE:
<221> NAME/KEY: Xaa
<222> LOCATION: (6)..(6)
<223> OTHER INFORMATION: Xaa may be selected from G or A
<220> FEATURE:
<221> NAME/KEY: Xaa
<222> LOCATION: (12)..(12)
<223> OTHER INFORMATION: Xaa may be selected from K or R

<400> SEQUENCE: 12

Glu Xaa Gln Arg Asn Xaa Phe Ile Gln Ser Leu Lys Asp Asp
1               5                   10

<210> SEQ ID NO 13
<211> LENGTH: 14
<212> TYPE: PRT
<213> ORGANISM: Artificial Sequence
<220> FEATURE:
<223> OTHER INFORMATION: Artificially synthesized domain 3 of Ig binding
      protein

<400> SEQUENCE: 13

Asn Lys Glu Gln Gln Asn Ala Phe Tyr Glu Ile Leu His Leu
1               5                   10

<210> SEQ ID NO 14
<211> LENGTH: 14
<212> TYPE: PRT
<213> ORGANISM: Artificial Sequence
<220> FEATURE:
<223> OTHER INFORMATION: Artificially synthesized domain 3 of Ig binding
      protein

<400> SEQUENCE: 14

Asn Lys Glu Gln Gln Asn Ala Phe Tyr Glu Ile Leu Asn Met
1               5                   10

<210> SEQ ID NO 15
<211> LENGTH: 14
<212> TYPE: PRT
```

```
<213> ORGANISM: Artificial Sequence
<220> FEATURE:
<223> OTHER INFORMATION: Artificially synthesized domain 3 of Ig binding
      protein

<400> SEQUENCE: 15

Asp Lys Asp Gln Gln Ala Ala Phe Tyr Glu Ile Leu His Leu
1               5                   10

<210> SEQ ID NO 16
<211> LENGTH: 14
<212> TYPE: PRT
<213> ORGANISM: Artificial Sequence
<220> FEATURE:
<223> OTHER INFORMATION: Artificially synthesized domain 3 of Ig binding
      protein

<400> SEQUENCE: 16

Asp Glu Ala Gln Gln Ala Ala Phe Tyr Glu Ile Leu His Leu
1               5                   10

<210> SEQ ID NO 17
<211> LENGTH: 14
<212> TYPE: PRT
<213> ORGANISM: Artificial Sequence
<220> FEATURE:
<223> OTHER INFORMATION: Artificially synthesized domain 3 of Ig binding
      protein

<400> SEQUENCE: 17

Asp Glu Ala Ala Gln Ala Ala Phe Tyr Glu Ile Leu His Leu
1               5                   10

<210> SEQ ID NO 18
<211> LENGTH: 14
<212> TYPE: PRT
<213> ORGANISM: Artificial Sequence
<220> FEATURE:
<223> OTHER INFORMATION: domain 3 of Ig binding protein
<220> FEATURE:
<221> NAME/KEY: Xaa
<222> LOCATION: (1)..(1)
<223> OTHER INFORMATION: Xaa may be selected from N or D
<220> FEATURE:
<221> NAME/KEY: Xaa
<222> LOCATION: (2)..(2)
<223> OTHER INFORMATION: Xaa may be selected from K or E
<220> FEATURE:
<221> NAME/KEY: Xaa
<222> LOCATION: (3)..(3)
<223> OTHER INFORMATION: Xaa may be selected from E, D, or A
<220> FEATURE:
<221> NAME/KEY: Xaa
<222> LOCATION: (4)..(4)
<223> OTHER INFORMATION: Xaa may be selected from Q or A
<220> FEATURE:
<221> NAME/KEY: Xaa
<222> LOCATION: (6)..(6)
<223> OTHER INFORMATION: Xaa may be selected from N or A
<220> FEATURE:
<221> NAME/KEY: Xaa
<222> LOCATION: (13)..(13)
<223> OTHER INFORMATION: Xaa may be selected from N or H
<220> FEATURE:
<221> NAME/KEY: Xaa
<222> LOCATION: (14)..(14)
<223> OTHER INFORMATION: Xaa may be selected from L or M

<400> SEQUENCE: 18

Xaa Xaa Xaa Xaa Gln Xaa Ala Phe Tyr Glu Ile Leu Xaa Xaa
1               5                   10
```

```
<210> SEQ ID NO 19
<211> LENGTH: 4
<212> TYPE: PRT
<213> ORGANISM: Artificial Sequence
<220> FEATURE:
<223> OTHER INFORMATION: Artificially synthesized linker 1 of Ig binding
      protein
<220> FEATURE:
<221> NAME/KEY: Xaa
<222> LOCATION: (4)..(4)
<223> OTHER INFORMATION: Xaa may be selected from T or S

<400> SEQUENCE: 19

Gly Gly Ile Xaa
1

<210> SEQ ID NO 20
<211> LENGTH: 4
<212> TYPE: PRT
<213> ORGANISM: Artificial Sequence
<220> FEATURE:
<223> OTHER INFORMATION: Artificially synthesized linker 1 of Ig binding
      protein
<220> FEATURE:
<221> NAME/KEY: Xaa
<222> LOCATION: (4)..(4)
<223> OTHER INFORMATION: Xaa may be selected from T or S

<400> SEQUENCE: 20

Gly Gly Leu Xaa
1

<210> SEQ ID NO 21
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 21

Ala Asp Asn Lys Phe
1               5

<210> SEQ ID NO 22
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 22

Ile Ala Ala Gln His
1               5

<210> SEQ ID NO 23
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 23

Ile Ala Ala Lys Phe
1               5
```

```
<210> SEQ ID NO 24
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 24

Ile Ala Ala Lys His
1               5

<210> SEQ ID NO 25
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 25

Ile Ala Ala Gln Phe
1               5

<210> SEQ ID NO 26
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 26

Ile Asp Ala Lys Phe
1               5

<210> SEQ ID NO 27
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 27

Ile Asp Ala Lys His
1               5

<210> SEQ ID NO 28
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 28

Ala Asp Asn Asn Phe
1               5

<210> SEQ ID NO 29
<211> LENGTH: 5
<212> TYPE: PRT
<213> ORGANISM: Artificial Sequence
<220> FEATURE:
<223> OTHER INFORMATION: Artificially synthesized N-terminal aa of Ig
      binding protein

<400> SEQUENCE: 29
```

```
Val Asp Asn Lys Phe
1               5

<210> SEQ ID NO 30
<211> LENGTH: 65
<212> TYPE: PRT
<213> ORGANISM: Artificial Sequence
<220> FEATURE:
<223> OTHER INFORMATION: Artificially synthesized consensus sequence of
      Ig binding protein
<220> FEATURE:
<221> NAME/KEY: Xaa
<222> LOCATION: (1)..(1)
<223> OTHER INFORMATION: Xaa may be selected from V, I, A, or absent
<220> FEATURE:
<221> NAME/KEY: Xaa
<222> LOCATION: (2)..(2)
<223> OTHER INFORMATION: Xaa may be selected from A or D, or absent
<220> FEATURE:
<221> NAME/KEY: Xaa
<222> LOCATION: (3)..(3)
<223> OTHER INFORMATION: Xaa may be selected from A or N, or absent
<220> FEATURE:
<221> NAME/KEY: Xaa
<222> LOCATION: (4)..(4)
<223> OTHER INFORMATION: Xaa may be selected from Q, N, or K, or absent
<220> FEATURE:
<221> NAME/KEY: Xaa
<222> LOCATION: (5)..(5)
<223> OTHER INFORMATION: Xaa may be selected from H or F, or absent
<220> FEATURE:
<221> NAME/KEY: Xaa
<222> LOCATION: (7)..(7)
<223> OTHER INFORMATION: Xaa may be selected from Q or V
<220> FEATURE:
<221> NAME/KEY: Xaa
<222> LOCATION: (9)..(9)
<223> OTHER INFORMATION: Xaa may be selected from L, A, or K
<220> FEATURE:
<221> NAME/KEY: Xaa
<222> LOCATION: (10)..(10)
<223> OTHER INFORMATION: Xaa may be selected from A, E, or N
<220> FEATURE:
<221> NAME/KEY: Xaa
<222> LOCATION: (11)..(11)
<223> OTHER INFORMATION: Xaa may be selected from I, V, or L
<220> FEATURE:
<221> NAME/KEY: Xaa
<222> LOCATION: (13)..(13)
<223> OTHER INFORMATION: Xaa may be selected from G or A
<220> FEATURE:
<221> NAME/KEY: Xaa
<222> LOCATION: (16)..(16)
<223> OTHER INFORMATION: Xaa may be selected from Q or K
<220> FEATURE:
<221> NAME/KEY: Xaa
<222> LOCATION: (20)..(20)
<223> OTHER INFORMATION: Xaa may be selected from E or D
<220> FEATURE:
<221> NAME/KEY: Xaa
<222> LOCATION: (21)..(21)
<223> OTHER INFORMATION: Xaa may be selected from S or A
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
```

```
<221> NAME/KEY: Xaa
<222> LOCATION: (29)..(29)
<223> OTHER INFORMATION: Xaa may be selected from D or E
<220> FEATURE:
<221> NAME/KEY: Xaa
<222> LOCATION: (33)..(33)
<223> OTHER INFORMATION: Xaa may be selected from G or A
<220> FEATURE:
<221> NAME/KEY: Xaa
<222> LOCATION: (39)..(39)
<223> OTHER INFORMATION: Xaa may be selected from R or K
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent
<220> FEATURE:
<221> NAME/KEY: misc_feature
<222> LOCATION: (50)..(51)
<223> OTHER INFORMATION: Xaa can be any naturally occurring amino acid
<220> FEATURE:
<221> NAME/KEY: Xaa
<222> LOCATION: (52)..(52)
<223> OTHER INFORMATION: Xaa may be selected from A, D, or E
<220> FEATURE:
<221> NAME/KEY: Xaa
<222> LOCATION: (53)..(53)
<223> OTHER INFORMATION: Xaa may be selected from A or Q
<220> FEATURE:
<221> NAME/KEY: Xaa
<222> LOCATION: (55)..(55)
<223> OTHER INFORMATION: Xaa may be selected from A or N
<220> FEATURE:
<221> NAME/KEY: Xaa
<222> LOCATION: (62)..(62)
<223> OTHER INFORMATION: Xaa may be selected from N or H
<220> FEATURE:
<221> NAME/KEY: Xaa
<222> LOCATION: (63)..(63)
<223> OTHER INFORMATION: Xaa may be selected from M or L
<220> FEATURE:
<221> NAME/KEY: Xaa
<222> LOCATION: (64)..(64)
<223> OTHER INFORMATION: Xaa may be selected from P or absent
<220> FEATURE:
<221> NAME/KEY: Xaa
<222> LOCATION: (65)..(65)
<223> OTHER INFORMATION: Xaa may be selected from P or K or absent

<400> SEQUENCE: 30

Xaa Xaa Xaa Xaa Xaa Ser Xaa Ser Xaa Xaa Xaa Leu Xaa Glu Ala Xaa
1               5                   10                  15

Lys Leu Asn Xaa Xaa Gln Xaa Xaa Xaa Xaa Glu Xaa Gln Arg Asn
            20                  25                  30

Xaa Phe Ile Gln Ser Leu Xaa Asp Asp Xaa Xaa Xaa Xaa Xaa Xaa Xaa
                35                  40                  45

Xaa Xaa Xaa Xaa Xaa Gln Xaa Ala Phe Tyr Glu Ile Leu Xaa Xaa Pro
    50                  55                  60

Xaa
65

<210> SEQ ID NO 31
<211> LENGTH: 65
<212> TYPE: PRT
```

<213> ORGANISM: Artificial Sequence
<220> FEATURE:
<223> OTHER INFORMATION: Artificially synthesized scaffold of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa may be any amino acid or absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 31

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Glu Glu Gln Arg Asn
            20                  25                  30

Gly Phe Ile Gln Ser Leu Lys Asp Asp Xaa Xaa Xaa Xaa Xaa Xaa
        35                  40                  45

Xaa Asn Lys Glu Gln Gln Asn Ala Phe Tyr Glu Ile Leu His Leu Pro
    50                  55                  60

Lys
65

<210> SEQ ID NO 32
<211> LENGTH: 65
<212> TYPE: PRT
<213> ORGANISM: Artificial Sequence
<220> FEATURE:
<223> OTHER INFORMATION: Artificially synthesized scaffold 2 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or

```
    absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 32

Ile Ala Ala Gln His Ser Val Ser Leu Glu Ile Leu Ala Glu Ala Lys
1               5                   10                  15

Lys Leu Asn Asp Ala Gln Xaa Xaa Xaa Xaa Glu Glu Gln Arg Asn
            20                  25                  30

Ala Phe Ile Gln Ser Leu Arg Asp Asp Xaa Xaa Xaa Xaa Xaa Xaa
        35                  40                  45

Xaa Asp Lys Asp Gln Gln Ala Ala Phe Tyr Glu Ile Leu His Leu Pro
    50                  55                  60

Lys
65

<210> SEQ ID NO 33
<211> LENGTH: 65
<212> TYPE: PRT
<213> ORGANISM: Artificial Sequence
<220> FEATURE:
<223> OTHER INFORMATION: Artificially synthesized scaffold 3 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 33

Ile Ala Ala Lys Phe Ser Val Ser Leu Glu Val Leu Gly Glu Ala Gln
1               5                   10                  15

Lys Leu Asn Asp Ser Gln Xaa Xaa Xaa Xaa Glu Glu Gln Arg Asn
            20                  25                  30

Ala Phe Ile Gln Ser Leu Arg Asp Asp Xaa Xaa Xaa Xaa Xaa Xaa
        35                  40                  45

Xaa Asp Glu Ala Gln Gln Ala Ala Phe Tyr Glu Ile Leu His Leu Pro
    50                  55                  60

Lys
65
```

```
<210> SEQ ID NO 34
<211> LENGTH: 65
<212> TYPE: PRT
<213> ORGANISM: Artificial Sequence
<220> FEATURE:
<223> OTHER INFORMATION: Artificially synthesized scaffold 4 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 34

Ile Asp Ala Lys Phe Ser Val Ser Leu Ala Leu Leu Ala Glu Ala Lys
1               5                   10                  15

Lys Leu Asn Asp Ala Gln Xaa Xaa Xaa Xaa Xaa Glu Asp Gln Arg Asn
            20                  25                  30

Ala Phe Ile Gln Ser Leu Arg Asp Asp Xaa Xaa Xaa Xaa Xaa Xaa
        35                  40                  45

Xaa Asp Glu Ala Gln Gln Ala Ala Phe Tyr Glu Ile Leu His Leu Pro
    50                  55                  60

Pro
65

<210> SEQ ID NO 35
<211> LENGTH: 65
<212> TYPE: PRT
<213> ORGANISM: Artificial Sequence
<220> FEATURE:
<223> OTHER INFORMATION: Artificially synthesized scaffold 5 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
```

```
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 35

Ile Asp Ala Lys Phe Ser Val Ser Leu Ala Leu Leu Ala Glu Ala Lys
1               5                   10                  15

Lys Leu Asn Asp Ala Gln Xaa Xaa Xaa Xaa Xaa Glu Asp Gln Arg Asn
            20                  25                  30

Ala Phe Ile Gln Ser Leu Arg Asp Asp Xaa Xaa Xaa Xaa Xaa Xaa Xaa
        35                  40                  45

Xaa Asp Glu Ala Ala Gln Ala Ala Phe Tyr Glu Ile Leu His Leu Pro
    50                  55                  60

Pro
65

<210> SEQ ID NO 36
<211> LENGTH: 65
<212> TYPE: PRT
<213> ORGANISM: Artificial Sequence
<220> FEATURE:
<223> OTHER INFORMATION: Artificially synthesized scaffold 6 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 36

Ala Asp Asn Lys Phe Ser Val Ser Lys Glu Ile Leu Ala Glu Ala Lys
1               5                   10                  15

Lys Leu Asn Asp Ala Gln Xaa Xaa Xaa Xaa Xaa Glu Glu Gln Arg Asn
            20                  25                  30

Gly Phe Ile Gln Ser Leu Lys Asp Asp Xaa Xaa Xaa Xaa Xaa Xaa Xaa
        35                  40                  45

Xaa Asn Lys Glu Gln Gln Asn Ala Phe Tyr Glu Ile Leu His Leu Pro
    50                  55                  60
```

Lys
65

<210> SEQ ID NO 37
<211> LENGTH: 65
<212> TYPE: PRT
<213> ORGANISM: Artificial Sequence
<220> FEATURE:
<223> OTHER INFORMATION: Artificially synthesized scaffold 7 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 37

Ala Asp Asn Asn Phe Ser Gln Ser Ala Asn Leu Leu Ala Glu Ala Lys
1               5                   10                  15

Lys Leu Asn Glu Ser Gln Xaa Xaa Xaa Xaa Xaa Glu Glu Gln Arg Asn
            20                  25                  30

Gly Phe Ile Gln Ser Leu Lys Asp Asp Xaa Xaa Xaa Xaa Xaa Xaa Xaa
        35                  40                  45

Xaa Asn Lys Glu Gln Gln Asn Ala Phe Tyr Glu Ile Leu Asn Met Pro
    50                  55                  60

Lys
65

<210> SEQ ID NO 38
<211> LENGTH: 65
<212> TYPE: PRT
<213> ORGANISM: Artificial Sequence
<220> FEATURE:
<223> OTHER INFORMATION: Artificially synthesized scaffold 8 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: Xaa
<222> LOCATION: (26)..(26)
<223> OTHER INFORMATION: Xaa can be any naturally occuring amino acid or
      absent
<220> FEATURE:
<221> NAME/KEY: Xaa
<222> LOCATION: (27)..(27)
<223> OTHER INFORMATION: Xaa can be any naturally occuring amino acid or
      absent

```
<220> FEATURE:
<221> NAME/KEY: misc_feature
<222> LOCATION: (42)..(47)
<223> OTHER INFORMATION: Xaa can be any naturally occurring amino acid
<220> FEATURE:
<221> NAME/KEY: Xaa
<222> LOCATION: (48)..(48)
<223> OTHER INFORMATION: Xaa can be any naturally occuring amino acid or
      absent
<220> FEATURE:
<221> NAME/KEY: Xaa
<222> LOCATION: (49)..(49)
<223> OTHER INFORMATION: Xaa can be any naturally occuring amino acid or
      absent

<400> SEQUENCE: 38

Val Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Glu Glu Gln Arg Asn
            20                  25                  30

Ala Phe Ile Gln Ser Leu Lys Asp Asp Xaa Xaa Xaa Xaa Xaa Xaa
        35                  40                  45

Xaa Asn Lys Glu Gln Gln Asn Ala Phe Tyr Glu Ile Leu His Leu Pro
    50                  55                  60

Lys
65

<210> SEQ ID NO 39
<211> LENGTH: 61
<212> TYPE: PRT
<213> ORGANISM: Artificial Sequence
<220> FEATURE:
<223> OTHER INFORMATION: Artificially synthesized Ig binding protein
      208843

<400> SEQUENCE: 39

Ala Asp Asn Lys Phe Ser Gln Ser Ala Asn Leu Leu Ala Glu Ala Lys
1               5                   10                  15

Lys Leu Asn Asp Ala Gln Pro Thr Leu Glu Glu Gln Arg Asn Gly Phe
            20                  25                  30

Ile Gln Ser Leu Lys Asp Asp Ala Leu Gly Asn Ala Asn Asn Lys Glu
        35                  40                  45

Gln Gln Asn Ala Phe Tyr Glu Ile Leu His Leu Pro Lys
    50                  55                  60

<210> SEQ ID NO 40
<211> LENGTH: 62
<212> TYPE: PRT
<213> ORGANISM: Artificial Sequence
<220> FEATURE:
<223> OTHER INFORMATION: Artificially synthesized Ig binding protein
      208844

<400> SEQUENCE: 40

Ala Asp Asn Lys Phe Ser Gln Ser Ala Asn Leu Leu Ala Glu Ala Lys
1               5                   10                  15

Lys Leu Asn Asp Ala Gln Gly Arg Leu Thr Glu Glu Gln Arg Asn Gly
            20                  25                  30

Phe Ile Gln Ser Leu Lys Asp Asp Val Arg Thr Glu His Ala Asn Lys
        35                  40                  45

Glu Gln Gln Asn Ala Phe Tyr Glu Ile Leu His Leu Pro Lys
    50                  55                  60
```

<210> SEQ ID NO 41
<211> LENGTH: 62
<212> TYPE: PRT
<213> ORGANISM: Artificial Sequence
<220> FEATURE:
<223> OTHER INFORMATION: Artificially synthesized Ig binding protein
      208846

<400> SEQUENCE: 41

Ala Asp Asn Lys Phe Ser Gln Ser Ala Asn Leu Leu Ala Glu Ala Lys
1               5                   10                  15

Lys Leu Asn Asp Ala Gln Gly Gly Ile Thr Glu Glu Gln Arg Asn Gly
            20                  25                  30

Phe Ile Gln Ser Leu Lys Asp Asp Ile Gly Ala Ser Pro Met Asn Lys
        35                  40                  45

Glu Gln Gln Asn Ala Phe Tyr Glu Ile Leu His Leu Pro Lys
    50                  55                  60

<210> SEQ ID NO 42
<211> LENGTH: 63
<212> TYPE: PRT
<213> ORGANISM: Artificial Sequence
<220> FEATURE:
<223> OTHER INFORMATION: Artificially synthesized Ig binding protein
      208847

<400> SEQUENCE: 42

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
            20                  25                  30

Phe Ile Gln Ser Leu Lys Asp Asp Val Pro Ala Gly Val Ala Asn Asn
        35                  40                  45

Lys Glu Gln Gln Asn Ala Phe Tyr Glu Ile Leu His Leu Pro Lys
    50                  55                  60

<210> SEQ ID NO 43
<211> LENGTH: 61
<212> TYPE: PRT
<213> ORGANISM: Artificial Sequence
<220> FEATURE:
<223> OTHER INFORMATION: Artificially synthesized scaffold 9 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: misc_feature
<222> LOCATION: (40)..(45)
<223> OTHER INFORMATION: Xaa can be any naturally occurring amino acid

<400> SEQUENCE: 43

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Glu Glu Gln Arg Asn Gly Phe
            20                  25                  30

Ile Gln Ser Leu Lys Asp Asp Xaa Xaa Xaa Xaa Xaa Xaa Asn Lys Glu
        35                  40                  45

Gln Gln Asn Ala Phe Tyr Glu Ile Leu His Leu Pro Lys
    50                  55                  60

<210> SEQ ID NO 44
<211> LENGTH: 62

```
<212> TYPE: PRT
<213> ORGANISM: Artificial Sequence
<220> FEATURE:
<223> OTHER INFORMATION: Artificially synthesized scaffold 10 of Ig
      binding protein
<220> FEATURE:
<221> NAME/KEY: misc_feature
<222> LOCATION: (23)..(26)
<223> OTHER INFORMATION: Xaa can be any naturally occurring amino acid
<220> FEATURE:
<221> NAME/KEY: misc_feature
<222> LOCATION: (41)..(46)
<223> OTHER INFORMATION: Xaa can be any naturally occurring amino acid

<400> SEQUENCE: 44

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Glu Glu Gln Arg Asn Gly
            20                  25                  30

Phe Ile Gln Ser Leu Lys Asp Asp Xaa Xaa Xaa Xaa Xaa Xaa Asn Lys
        35                  40                  45

Glu Gln Gln Asn Ala Phe Tyr Glu Ile Leu His Leu Pro Lys
    50                  55                  60

<210> SEQ ID NO 45
<211> LENGTH: 62
<212> TYPE: PRT
<213> ORGANISM: Artificial Sequence
<220> FEATURE:
<223> OTHER INFORMATION: Artificially synthesized scaffold 11 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: misc_feature
<222> LOCATION: (40)..(46)
<223> OTHER INFORMATION: Xaa can be any naturally occurring amino acid

<400> SEQUENCE: 45

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Glu Glu Gln Arg Asn Gly Phe
            20                  25                  30

Ile Gln Ser Leu Lys Asp Asp Xaa Xaa Xaa Xaa Xaa Xaa Xaa Asn Lys
        35                  40                  45

Glu Gln Gln Asn Ala Phe Tyr Glu Ile Leu His Leu Pro Lys
    50                  55                  60

<210> SEQ ID NO 46
<211> LENGTH: 63
<212> TYPE: PRT
<213> ORGANISM: Artificial Sequence
<220> FEATURE:
<223> OTHER INFORMATION: Artificially synthesized scaffold 12 of Ig
      binding protein
<220> FEATURE:
<221> NAME/KEY: misc_feature
<222> LOCATION: (23)..(27)
<223> OTHER INFORMATION: Xaa can be any naturally occurring amino acid
<220> FEATURE:
<221> NAME/KEY: misc_feature
<222> LOCATION: (42)..(47)
<223> OTHER INFORMATION: Xaa can be any naturally occurring amino acid

<400> SEQUENCE: 46

Ala Asp Asn Lys Phe Ser Gln Ser Ala Asn Leu Leu Ala Glu Ala Lys
```

```
                1               5                   10                  15
Lys Leu Asn Asp Ala Gln Xaa Xaa Xaa Xaa Glu Glu Gln Arg Asn
                20                  25                  30

Gly Phe Ile Gln Ser Leu Lys Asp Asp Xaa Xaa Xaa Xaa Xaa Asn
                35                  40                  45

Lys Glu Gln Gln Asn Ala Phe Tyr Glu Ile Leu His Leu Pro Lys
                50                  55                  60

<210> SEQ ID NO 47
<211> LENGTH: 63
<212> TYPE: PRT
<213> ORGANISM: Artificial Sequence
<220> FEATURE:
<223> OTHER INFORMATION: Artificially synthesized scaffold 13 of Ig
      binding protein
<220> FEATURE:
<221> NAME/KEY: misc_feature
<222> LOCATION: (23)..(26)
<223> OTHER INFORMATION: Xaa can be any naturally occurring amino acid
<220> FEATURE:
<221> NAME/KEY: misc_feature
<222> LOCATION: (41)..(47)
<223> OTHER INFORMATION: Xaa can be any naturally occurring amino acid

<400> SEQUENCE: 47

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Glu Glu Gln Arg Asn Gly
                20                  25                  30

Phe Ile Gln Ser Leu Lys Asp Asp Xaa Xaa Xaa Xaa Xaa Xaa Xaa Asn
                35                  40                  45

Lys Glu Gln Gln Asn Ala Phe Tyr Glu Ile Leu His Leu Pro Lys
                50                  55                  60

<210> SEQ ID NO 48
<211> LENGTH: 63
<212> TYPE: PRT
<213> ORGANISM: Artificial Sequence
<220> FEATURE:
<223> OTHER INFORMATION: Artificially synthesized scaffold 14 of Ig
      binding protein
<220> FEATURE:
<221> NAME/KEY: misc_feature
<222> LOCATION: (23)..(25)
<223> OTHER INFORMATION: Xaa can be any naturally occurring amino acid
<220> FEATURE:
<221> NAME/KEY: misc_feature
<222> LOCATION: (40)..(47)
<223> OTHER INFORMATION: Xaa can be any naturally occurring amino acid

<400> SEQUENCE: 48

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Glu Glu Gln Arg Asn Gly Phe
                20                  25                  30

Ile Gln Ser Leu Lys Asp Asp Xaa Xaa Xaa Xaa Xaa Xaa Xaa Xaa Asn
                35                  40                  45

Lys Glu Gln Gln Asn Ala Phe Tyr Glu Ile Leu His Leu Pro Lys
                50                  55                  60

<210> SEQ ID NO 49
<211> LENGTH: 64
<212> TYPE: PRT
<213> ORGANISM: Artificial Sequence
<220> FEATURE:
```

```
<223> OTHER INFORMATION: Artificially synthesized scaffold 15 of Ig
      binding protein
<220> FEATURE:
<221> NAME/KEY: misc_feature
<222> LOCATION: (23)..(27)
<223> OTHER INFORMATION: Xaa can be any naturally occurring amino acid
<220> FEATURE:
<221> NAME/KEY: misc_feature
<222> LOCATION: (42)..(48)
<223> OTHER INFORMATION: Xaa can be any naturally occurring amino acid

<400> SEQUENCE: 49

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Xaa Glu Glu Gln Arg Asn
            20                  25                  30

Gly Phe Ile Gln Ser Leu Lys Asp Asp Xaa Xaa Xaa Xaa Xaa Xaa Xaa
        35                  40                  45

Asn Lys Glu Gln Gln Asn Ala Phe Tyr Glu Ile Leu His Leu Pro Lys
    50                  55                  60

<210> SEQ ID NO 50
<211> LENGTH: 64
<212> TYPE: PRT
<213> ORGANISM: Artificial Sequence
<220> FEATURE:
<223> OTHER INFORMATION: Artificially synthesized scaffold 16 of Ig
      binding protein
<220> FEATURE:
<221> NAME/KEY: misc_feature
<222> LOCATION: (23)..(26)
<223> OTHER INFORMATION: Xaa can be any naturally occurring amino acid
<220> FEATURE:
<221> NAME/KEY: misc_feature
<222> LOCATION: (41)..(48)
<223> OTHER INFORMATION: Xaa can be any naturally occurring amino acid

<400> SEQUENCE: 50

Ala Asp Asn Lys Phe Ser Gln Ser Ala Asn Leu Leu Ala Glu Ala Lys
1               5                   10                  15

Lys Leu Asn Asp Ala Gln Xaa Xaa Xaa Xaa Glu Glu Gln Arg Asn Gly
            20                  25                  30

Phe Ile Gln Ser Leu Lys Asp Asp Xaa Xaa Xaa Xaa Xaa Xaa Xaa Xaa
        35                  40                  45

Asn Lys Glu Gln Gln Asn Ala Phe Tyr Glu Ile Leu His Leu Pro Lys
    50                  55                  60

<210> SEQ ID NO 51
<211> LENGTH: 65
<212> TYPE: PRT
<213> ORGANISM: Artificial Sequence
<220> FEATURE:
<223> OTHER INFORMATION: Artificially synthesized scaffold of Ig binding
      protein (consensus 1)
<220> FEATURE:
<221> NAME/KEY: misc_feature
<222> LOCATION: (1)..(5)
<223> OTHER INFORMATION: Xaa can be any naturally occurring amino acid
<220> FEATURE:
<221> NAME/KEY: misc_feature
<222> LOCATION: (23)..(27)
<223> OTHER INFORMATION: Xaa can be any naturally occurring amino acid
<220> FEATURE:
<221> NAME/KEY: misc_feature
<222> LOCATION: (42)..(49)
<223> OTHER INFORMATION: Xaa can be any naturally occurring amino acid
<220> FEATURE:
<221> NAME/KEY: misc_feature
<222> LOCATION: (65)..(65)
```

<223> OTHER INFORMATION: Xaa can be any naturally occurring amino acid

<400> SEQUENCE: 51

```
Xaa Xaa Xaa Xaa Xaa Ser Gln Ser Ala Asn Leu Leu Ala Glu Ala Lys
1               5                   10                  15

Lys Leu Asn Asp Ala Gln Xaa Xaa Xaa Xaa Xaa Glu Glu Gln Arg Asn
            20                  25                  30

Gly Phe Ile Gln Ser Leu Lys Asp Asp Xaa Xaa Xaa Xaa Xaa Xaa Xaa
            35                  40                  45

Xaa Asn Lys Glu Gln Gln Asn Ala Phe Tyr Glu Ile Leu His Leu Pro
    50                  55                  60

Xaa
65
```

<210> SEQ ID NO 52
<211> LENGTH: 65
<212> TYPE: PRT
<213> ORGANISM: Artificial Sequence
<220> FEATURE:
<223> OTHER INFORMATION: Artificially synthesized scaffold of Ig binding protein (consensus 2)
<220> FEATURE:
<221> NAME/KEY: misc_feature
<222> LOCATION: (1)..(5)
<223> OTHER INFORMATION: Xaa can be any naturally occurring amino acid
<220> FEATURE:
<221> NAME/KEY: misc_feature
<222> LOCATION: (23)..(27)
<223> OTHER INFORMATION: Xaa can be any naturally occurring amino acid
<220> FEATURE:
<221> NAME/KEY: misc_feature
<222> LOCATION: (42)..(49)
<223> OTHER INFORMATION: Xaa can be any naturally occurring amino acid
<220> FEATURE:
<221> NAME/KEY: misc_feature
<222> LOCATION: (65)..(65)
<223> OTHER INFORMATION: Xaa can be any naturally occurring amino acid

<400> SEQUENCE: 52

```
Xaa Xaa Xaa Xaa Xaa Ser Val Ser Leu Glu Ile Leu Ala Glu Ala Lys
1               5                   10                  15

Lys Leu Asn Asp Ala Gln Xaa Xaa Xaa Xaa Xaa Glu Glu Gln Arg Asn
            20                  25                  30

Ala Phe Ile Gln Ser Leu Arg Asp Asp Xaa Xaa Xaa Xaa Xaa Xaa Xaa
            35                  40                  45

Xaa Asp Lys Asp Gln Gln Ala Ala Phe Tyr Glu Ile Leu His Leu Pro
    50                  55                  60

Xaa
65
```

<210> SEQ ID NO 53
<211> LENGTH: 63
<212> TYPE: PRT
<213> ORGANISM: Artificial Sequence
<220> FEATURE:
<223> OTHER INFORMATION: Artificially synthesized Fc binding protein 213333

<400> SEQUENCE: 53

```
Ala Asp Asn Lys Phe Ser Gln Ser Ala Asn Leu Leu Ala Glu Ala Lys
1               5                   10                  15

Lys Leu Asn Asp Ala Gln Gly Gly Ile Thr Glu Glu Gln Arg Asn Gly
            20                  25                  30

Phe Ile Gln Ser Leu Lys Asp Asp Ala Lys Thr Asn Pro Gly Asn Asn
```

```
                    35                  40                  45

Lys Glu Gln Gln Asn Ala Phe Tyr Glu Ile Leu His Leu Pro Lys
    50                  55                  60

<210> SEQ ID NO 54
<211> LENGTH: 62
<212> TYPE: PRT
<213> ORGANISM: Artificial Sequence
<220> FEATURE:
<223> OTHER INFORMATION: Artificially synthesized Fc binding protein
      213278

<400> SEQUENCE: 54

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
                20                  25                  30

Phe Ile Gln Ser Leu Lys Asp Asp Met Asn Val Gly Lys His Asn Lys
            35                  40                  45

Glu Gln Gln Asn Ala Phe Tyr Glu Ile Leu His Leu Pro Lys
    50                  55                  60

<210> SEQ ID NO 55
<211> LENGTH: 63
<212> TYPE: PRT
<213> ORGANISM: Artificial Sequence
<220> FEATURE:
<223> OTHER INFORMATION: Artificially synthesized Fc binding protein
      213276

<400> SEQUENCE: 55

Ala Asp Asn Lys Phe Ser Gln Ser Ala Asn Leu Leu Ala Glu Ala Lys
1               5                   10                  15

Lys Leu Asn Asp Ala Gln Gly Gly Ile Thr Glu Glu Gln Arg Asn Gly
                20                  25                  30

Phe Ile Gln Ser Leu Lys Asp Asp Ala Lys Ala Asn Pro Glu Ala Asn
            35                  40                  45

Lys Glu Gln Gln Asn Ala Phe Tyr Glu Ile Leu His Leu Pro Lys
    50                  55                  60

<210> SEQ ID NO 56
<211> LENGTH: 62
<212> TYPE: PRT
<213> ORGANISM: Artificial Sequence
<220> FEATURE:
<223> OTHER INFORMATION: Artificially synthesized Fc binding protein
      213246

<400> SEQUENCE: 56

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
                20                  25                  30

Phe Ile Gln Ser Leu Lys Asp Asp Val Arg Arg Val Gly Ser Asn Lys
            35                  40                  45

Glu Gln Gln Asn Ala Phe Tyr Glu Ile Leu His Leu Pro Lys
    50                  55                  60

<210> SEQ ID NO 57
<211> LENGTH: 63
<212> TYPE: PRT
<213> ORGANISM: Artificial Sequence
```

```
<220> FEATURE:
<223> OTHER INFORMATION: Artificially synthesized Fc binding protein
      213235

<400> SEQUENCE: 57

Ala Asp Asn Lys Phe Ser Gln Ser Ala Asn Leu Leu Ala Glu Ala Lys
1               5                   10                  15

Lys Leu Ser Asp Ala Gln Arg Gly Leu Thr Glu Glu Gln Arg Asn Gly
            20                  25                  30

Phe Ile Gln Ser Leu Lys Asp Asp Thr Lys Arg His Pro Lys Met Asn
        35                  40                  45

Lys Glu Gln Gln Asn Ala Phe Tyr Glu Ile Leu His Leu Pro Lys
    50                  55                  60

<210> SEQ ID NO 58
<211> LENGTH: 62
<212> TYPE: PRT
<213> ORGANISM: Artificial Sequence
<220> FEATURE:
<223> OTHER INFORMATION: Artificially synthesized Fc binding protein
      213224

<400> SEQUENCE: 58

Ala Asp Asn Lys Phe Ser Gln Ser Ala Asn Leu Leu Ala Glu Ala Lys
1               5                   10                  15

Lys Leu Asn Asp Ala Gln Asn Gly Leu Thr Glu Glu Gln Arg Asn Gly
            20                  25                  30

Phe Ile Gln Ser Leu Lys Asp Asp Val Arg Thr Asn Gly Ala Asn Lys
        35                  40                  45

Glu Gln Gln Asn Ala Phe Tyr Glu Ile Leu His Leu Pro Lys
50                  55                  60

<210> SEQ ID NO 59
<211> LENGTH: 62
<212> TYPE: PRT
<213> ORGANISM: Artificial Sequence
<220> FEATURE:
<223> OTHER INFORMATION: Artificially synthesized Fc binding proteinj
      213215

<400> SEQUENCE: 59

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
            20                  25                  30

Phe Ile Gln Ser Leu Lys Asp Asp Val Arg Lys Leu Gly Pro Asn Lys
        35                  40                  45

Glu Gln Gln Asn Ala Phe Tyr Glu Ile Leu His Leu Pro Lys
50                  55                  60

<210> SEQ ID NO 60
<211> LENGTH: 62
<212> TYPE: PRT
<213> ORGANISM: Artificial Sequence
<220> FEATURE:
<223> OTHER INFORMATION: Artificially synthesized Fc binding protein
      213213

<400> SEQUENCE: 60

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
```

```
                    20                  25                  30

Phe Ile Gln Ser Leu Lys Asp Asp His Thr Pro Thr Arg Gly Asn Lys
                35                  40                  45

Glu Gln Gln Asn Ala Phe Tyr Glu Ile Leu His Leu Pro Lys
        50                  55                  60

<210> SEQ ID NO 61
<211> LENGTH: 63
<212> TYPE: PRT
<213> ORGANISM: Artificial Sequence
<220> FEATURE:
<223> OTHER INFORMATION: Artificially synthesized Fc binding protein
      213204

<400> SEQUENCE: 61

Ala Asp Asn Lys Phe Ser Gln Ser Ala Asn Leu Leu Ala Glu Ala Lys
1               5                  10                  15

Lys Leu Asn Asp Ala Gln Gly Gly Leu Thr Glu Glu Gln Arg Asn Gly
                20                  25                  30

Phe Ile Gln Ser Leu Lys Asp Asp Thr Lys Ala Asn Pro Ala Arg Asn
                35                  40                  45

Lys Glu Gln Gln Asn Ala Phe Tyr Glu Ile Leu His Leu Pro Lys
        50                  55                  60

<210> SEQ ID NO 62
<211> LENGTH: 63
<212> TYPE: PRT
<213> ORGANISM: Artificial Sequence
<220> FEATURE:
<223> OTHER INFORMATION: Artificially synthesized Fc binding protein
      213197

<400> SEQUENCE: 62

Ala Asp Asn Lys Phe Ser Gln Ser Ala Asn Leu Leu Ala Glu Ala Lys
1               5                  10                  15

Lys Leu Asn Asp Ala Gln Gly Gly Leu Thr Glu Glu Gln Arg Asn Gly
                20                  25                  30

Phe Ile Gln Ser Leu Lys Asp Asp Thr Ala Ala Asn Pro Thr Ala Asn
                35                  40                  45

Lys Glu Gln Gln Asn Ala Phe Tyr Glu Ile Leu His Leu Pro Lys
        50                  55                  60

<210> SEQ ID NO 63
<211> LENGTH: 62
<212> TYPE: PRT
<213> ORGANISM: Artificial Sequence
<220> FEATURE:
<223> OTHER INFORMATION: Artificially synthesized Fc binding protein
      213191

<400> SEQUENCE: 63

Ala Asp Asn Lys Phe Ser Gln Ser Ala Asn Leu Leu Ala Glu Ala Lys
1               5                  10                  15

Lys Leu Asn Asp Ala Gln Gly Gly Leu Thr Glu Glu Gln Arg Asn Gly
                20                  25                  30

Phe Ile Gln Ser Leu Lys Asp Asp Gly Thr Glu Gly Val His Asn Lys
                35                  40                  45

Glu Gln Gln Asn Ala Phe Tyr Glu Ile Leu His Leu Pro Lys
        50                  55                  60

<210> SEQ ID NO 64
```

<211> LENGTH: 62
<212> TYPE: PRT
<213> ORGANISM: Artificial Sequence
<220> FEATURE:
<223> OTHER INFORMATION: Artificially synthesized Fc binding protein 213195

<400> SEQUENCE: 64

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
            20                  25                  30

Phe Ile Gln Ser Leu Lys Asp Asp Ile Val Gly Gly Arg Ala Asn Lys
        35                  40                  45

Glu Gln Gln Asn Ala Phe Tyr Glu Ile Leu His Leu Pro Lys
    50                  55                  60

<210> SEQ ID NO 65
<211> LENGTH: 64
<212> TYPE: PRT
<213> ORGANISM: Artificial Sequence
<220> FEATURE:
<223> OTHER INFORMATION: Artificially synthesized Fc binding protein 210279

<400> SEQUENCE: 65

Ala Asp Asn Lys Phe Ser Gln Ser Ala Asn Leu Leu Ala Glu Ala Lys
1               5                   10                  15

Lys Leu Asn Asp Ala Gln Gly Gly Leu Thr Glu Glu Gln Arg Asn Gly
            20                  25                  30

Phe Ile Gln Ser Leu Lys Asp Asp Thr His Pro Glu Asp Arg Gln His
        35                  40                  45

Asn Lys Glu Gln Gln Asn Ala Phe Tyr Glu Ile Leu His Leu Pro Lys
    50                  55                  60

<210> SEQ ID NO 66
<211> LENGTH: 63
<212> TYPE: PRT
<213> ORGANISM: Artificial Sequence
<220> FEATURE:
<223> OTHER INFORMATION: Artificially synthesized Fc binding protein 210259

<400> SEQUENCE: 66

Ala Asp Asn Lys Phe Ser Gln Ser Ala Asn Leu Leu Ala Glu Ala Lys
1               5                   10                  15

Lys Leu Asn Asp Ala Gln Gly Gly Ile Thr Glu Glu Gln Arg Asn Gly
            20                  25                  30

Phe Ile Gln Ser Leu Lys Asp Asp Ala Lys Arg Asn Pro Met Thr Asn
        35                  40                  45

Lys Glu Gln Gln Asn Ala Phe Tyr Glu Ile Leu His Leu Pro Lys
    50                  55                  60

<210> SEQ ID NO 67
<211> LENGTH: 63
<212> TYPE: PRT
<213> ORGANISM: Artificial Sequence
<220> FEATURE:
<223> OTHER INFORMATION: Artificially synthesized Fc binding protein 210240

<400> SEQUENCE: 67

Ala Asp Asn Lys Phe Ser Gln Ser Ala Asn Leu Leu Ala Glu Ala Lys

```
                1               5                  10                  15
Lys Leu Asn Asp Ala Gln Gly Gly Leu Thr Glu Glu Gln Arg Asn Gly
               20                  25                  30

Phe Ile Gln Ser Leu Lys Asp Asp Pro Val Leu Arg Gly Lys Pro Asn
        35                  40                  45

Lys Glu Gln Gln Asn Ala Phe Tyr Glu Ile Leu His Leu Pro Lys
    50                  55                  60
```

<210> SEQ ID NO 68
<211> LENGTH: 62
<212> TYPE: PRT
<213> ORGANISM: Artificial Sequence
<220> FEATURE:
<223> OTHER INFORMATION: Artificially synthesized Fc binding protein
      210234

<400> SEQUENCE: 68

```
Ala Asp Asn Lys Phe Ser Gln Ser Ala Asn Leu Leu Ala Glu Ala Lys
1               5                  10                  15

Lys Leu Asn Asp Ala Gln Gly Gly Leu Thr Glu Glu Gln Arg Asn Gly
               20                  25                  30

Phe Ile Gln Ser Leu Lys Asp Asp Ala Ser Glu Lys Gly Ala Asn Lys
        35                  40                  45

Glu Gln Gln Asn Ala Phe Tyr Glu Ile Leu His Leu Pro Lys
    50                  55                  60
```

<210> SEQ ID NO 69
<211> LENGTH: 64
<212> TYPE: PRT
<213> ORGANISM: Artificial Sequence
<220> FEATURE:
<223> OTHER INFORMATION: Artificially synthesized Fc binding protein
      213265

<400> SEQUENCE: 69

```
Ala Asp Asn Lys Phe Ser Gln Ser Ala Asn Leu Leu Ala Glu Ala Lys
1               5                  10                  15

Lys Leu Asn Asp Ala Gln Gln Gly Gly Leu Thr Glu Glu Gln Arg Asn
               20                  25                  30

Gly Phe Ile Gln Ser Leu Lys Met Ile Ala Leu Asn Ser Pro Thr Ser
        35                  40                  45

Thr Lys Glu Gln Gln Asn Ala Phe Tyr Glu Ile Leu His Leu Pro Lys
    50                  55                  60
```

<210> SEQ ID NO 70
<211> LENGTH: 62
<212> TYPE: PRT
<213> ORGANISM: Artificial Sequence
<220> FEATURE:
<223> OTHER INFORMATION: Artificially synthesized Fc binding protein
      208514

<400> SEQUENCE: 70

```
Ala Asp Asn Lys Phe Ser Gln Ser Ala Asn Leu Leu Ala Glu Ala Lys
1               5                  10                  15

Lys Leu Asn Asp Ala Gln Gly Gly Leu Thr Glu Glu Gln Arg Asn Gly
               20                  25                  30

Phe Ile Gln Ser Leu Lys Asp Asp Val Pro Ala Gly Val Ala Asn Lys
        35                  40                  45

Glu Gln Gln Asn Ala Phe Tyr Glu Ile Leu His Leu Pro Lys
    50                  55                  60
```

```
<210> SEQ ID NO 71
<211> LENGTH: 63
<212> TYPE: PRT
<213> ORGANISM: Artificial Sequence
<220> FEATURE:
<223> OTHER INFORMATION: Artificially synthesized non-Ig binding 213249

<400> SEQUENCE: 71

Ala Asp Asn Lys Phe Ser Gln Ser Ala Asn Leu Leu Ala Glu Ala Lys
1               5                   10                  15

Lys Leu Asn Asp Ala Gln Glu Gly Gly Leu Thr Glu Glu Gln Arg Asn
            20                  25                  30

Gly Phe Ile Gln Ser Leu Lys Asp Asp Asn Arg Leu Thr Lys Asp Asn
        35                  40                  45

Lys Glu Gln Gln Asn Ala Phe Tyr Glu Ile Leu His Leu Pro Lys
    50                  55                  60

<210> SEQ ID NO 72
<211> LENGTH: 62
<212> TYPE: PRT
<213> ORGANISM: Artificial Sequence
<220> FEATURE:
<223> OTHER INFORMATION: Artificially synthesized non-Ig binding 206091

<400> SEQUENCE: 72

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Arg Ser Thr Arg Ser Thr Arg Asn Lys
        35                  40                  45

Glu Gln Gln Asn Ala Phe Tyr Glu Ile Leu His Leu Pro Lys
    50                  55                  60

<210> SEQ ID NO 73
<211> LENGTH: 62
<212> TYPE: PRT
<213> ORGANISM: Artificial Sequence
<220> FEATURE:
<223> OTHER INFORMATION: Artificially synthesized non-Ig binding 206092

<400> SEQUENCE: 73

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Arg Arg Thr Ser Arg Thr Ser Asn Lys
        35                  40                  45

Glu Gln Gln Asn Ala Phe Tyr Glu Ile Leu His Leu Pro Lys
    50                  55                  60

<210> SEQ ID NO 74
<211> LENGTH: 62
<212> TYPE: PRT
<213> ORGANISM: Artificial Sequence
<220> FEATURE:
<223> OTHER INFORMATION: Artificially synthesized non-Ig binding 206093

<400> SEQUENCE: 74

Ala Asp Asn Lys Phe Ser Gln Ser Ala Asn Leu Leu Ala Glu Ala Lys
1               5                   10                  15
```

Lys Leu Asn Asp Ala Gln Arg Thr Ser Glu Glu Gln Arg Asn Gly Phe
            20                  25                  30

Ile Gln Ser Leu Lys Asp Asp Arg Ala Arg Arg Ala Arg Asn Lys
        35                  40                  45

Glu Gln Gln Asn Ala Phe Tyr Glu Ile Leu His Leu Pro Lys
    50                  55                  60

<210> SEQ ID NO 75
<211> LENGTH: 62
<212> TYPE: PRT
<213> ORGANISM: Artificial Sequence
<220> FEATURE:
<223> OTHER INFORMATION: Artificially synthesized non-Ig binding 206094

<400> SEQUENCE: 75

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Arg Ser Thr Leu Thr Ser Arg Asn Lys
        35                  40                  45

Glu Gln Gln Asn Ala Phe Tyr Glu Ile Leu His Leu Pro Lys
    50                  55                  60

<210> SEQ ID NO 76
<211> LENGTH: 62
<212> TYPE: PRT
<213> ORGANISM: Artificial Sequence
<220> FEATURE:
<223> OTHER INFORMATION: Artificially synthesized non-Ig binding 206096

<400> SEQUENCE: 76

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Arg Ser Thr Leu Ser Thr Leu Asn Lys
        35                  40                  45

Glu Gln Gln Asn Ala Phe Tyr Glu Ile Leu His Leu Pro Lys
    50                  55                  60

<210> SEQ ID NO 77
<211> LENGTH: 62
<212> TYPE: PRT
<213> ORGANISM: Artificial Sequence
<220> FEATURE:
<223> OTHER INFORMATION: Artificially synthesized non-Ig binding 206097

<400> SEQUENCE: 77

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Leu Thr Ser Leu Thr Ser Leu Asn Lys
        35                  40                  45

Glu Gln Gln Asn Ala Phe Tyr Glu Ile Leu His Leu Pro Lys
    50                  55                  60

<210> SEQ ID NO 78
<211> LENGTH: 62

```
<212> TYPE: PRT
<213> ORGANISM: Artificial Sequence
<220> FEATURE:
<223> OTHER INFORMATION: Artificially synthesized non-Ig binding protein
      206090

<400> SEQUENCE: 78

Ala Asp Asn Lys Phe Ser Gln Ser Ala Asn Leu Leu Ala Glu Ala Lys
1               5                   10                  15

Lys Leu Asn Asp Ala Gln Arg Thr Ser Glu Glu Gln Arg Asn Gly Phe
            20                  25                  30

Ile Gln Ser Leu Lys Asp Asp Arg Thr Ser Arg Thr Ser Arg Asn Lys
        35                  40                  45

Glu Gln Gln Asn Ala Phe Tyr Glu Ile Leu His Leu Pro Lys
    50                  55                  60

<210> SEQ ID NO 79
<211> LENGTH: 41
<212> TYPE: PRT
<213> ORGANISM: Artificial Sequence
<220> FEATURE:
<223> OTHER INFORMATION: Artificially synthesized non Ig binding protein
      204038

<400> SEQUENCE: 79

Ala Asp Asn Lys Phe Glu Glu Gln Arg Asn Gly Phe Ile Gln Ser Leu
1               5                   10                  15

Lys Asp Asp Leu Glu Glu Gly Lys Leu Ser Asn Lys Glu Gln Gln Asn
            20                  25                  30

Ala Phe Tyr Glu Ile Leu His Leu Pro
        35                  40

<210> SEQ ID NO 80
<211> LENGTH: 38
<212> TYPE: PRT
<213> ORGANISM: Artificial Sequence
<220> FEATURE:
<223> OTHER INFORMATION: Artificially synthesized non Ig binding protein
      404039

<400> SEQUENCE: 80

Ala Asp Asn Lys Phe Glu Glu Gln Arg Asn Gly Phe Ile Gln Ser Leu
1               5                   10                  15

Lys Asp Asp Asp Leu Leu Phe Asn Lys Glu Gln Gln Asn Ala Phe Tyr
            20                  25                  30

Glu Ile Leu His Leu Pro
        35

<210> SEQ ID NO 81
<211> LENGTH: 41
<212> TYPE: PRT
<213> ORGANISM: Artificial Sequence
<220> FEATURE:
<223> OTHER INFORMATION: Artificially synthesized non Ig binding protein
      204040

<400> SEQUENCE: 81

Ala Asp Asn Lys Phe Glu Glu Gln Arg Asn Gly Phe Ile Gln Ser Leu
1               5                   10                  15

Lys Asp Asp Leu Lys Ala Asn Leu Leu Phe Asn Lys Glu Gln Gln Asn
            20                  25                  30

Ala Phe Tyr Glu Ile Leu His Leu Pro
        35                  40
```

<210> SEQ ID NO 82
<211> LENGTH: 39
<212> TYPE: PRT
<213> ORGANISM: Artificial Sequence
<220> FEATURE:
<223> OTHER INFORMATION: Artificially synthesized non Ig binding protein
      204041

<400> SEQUENCE: 82

Ala Asp Asn Lys Phe Glu Glu Gln Arg Asn Gly Phe Ile Gln Ser Leu
1               5                   10                  15

Lys Asp Asp Leu Thr Pro Glu Lys Asn Lys Glu Gln Gln Asn Ala Phe
            20                  25                  30

Tyr Glu Ile Leu His Leu Pro
        35

<210> SEQ ID NO 83
<211> LENGTH: 5
<212> TYPE: PRT
<213> ORGANISM: Artificial Sequence
<220> FEATURE:
<223> OTHER INFORMATION: Artificially synthesized linker 1
<220> FEATURE:
<221> NAME/KEY: Xaa
<222> LOCATION: (3)..(3)
<223> OTHER INFORMATION: Xaa may be any amino acid preferably selected
      from T or S
<220> FEATURE:
<221> NAME/KEY: Xaa
<222> LOCATION: (3)..(3)
<223> OTHER INFORMATION: Xaa may be any amino acid , preferably selected
      from T or S or R or G or N
<220> FEATURE:
<221> NAME/KEY: Xaa
<222> LOCATION: (3)..(3)
<223> OTHER INFORMATION: Xaa may be any amino acid, preferably selected
      from T or S

<400> SEQUENCE: 83

Gly Gly Xaa Leu Thr
1               5

<210> SEQ ID NO 84
<211> LENGTH: 4
<212> TYPE: PRT
<213> ORGANISM: Artificial Sequence
<220> FEATURE:
<223> OTHER INFORMATION: Artificially synthesized linker 1
<220> FEATURE:
<221> NAME/KEY: Xaa
<222> LOCATION: (1)..(1)
<223> OTHER INFORMATION: Xaa may be any amino acid, preferably selected
      from R or N or G

<400> SEQUENCE: 84

Xaa Gly Leu Thr
1

<210> SEQ ID NO 85
<211> LENGTH: 4
<212> TYPE: PRT
<213> ORGANISM: Artificial Sequence
<220> FEATURE:
<223> OTHER INFORMATION: Artificially synthesized linker 1
<220> FEATURE:
<221> NAME/KEY: Xaa
<222> LOCATION: (2)..(2)
<223> OTHER INFORMATION: Xaa may be any amino acid, preferably selected
      from T or S or R or G or N

```
<400> SEQUENCE: 85

Gly Xaa Leu Thr
1

<210> SEQ ID NO 86
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 86

Ala Lys Thr Asn Pro Gly Asn
1               5

<210> SEQ ID NO 87
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 87

Ala Lys Ala Asn Pro Glu Ala
1               5

<210> SEQ ID NO 88
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 88

Ala Lys Arg Asn Pro Met Thr
1               5

<210> SEQ ID NO 89
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 89

Ala Leu Asn Ser Pro Thr Ser
1               5

<210> SEQ ID NO 90
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 90

Ala Ser Glu Lys Gly Ala
1               5

<210> SEQ ID NO 91
<211> LENGTH: 6
```

```
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 91

Ala Leu Gly Asn Ala Asn
1               5

<210> SEQ ID NO 92
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 92

Thr Lys Arg His Pro Lys Met
1               5

<210> SEQ ID NO 93
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 93

Thr Lys Ala Asn Pro Ala Arg
1               5

<210> SEQ ID NO 94
<211> LENGTH: 7
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 94

Thr Ala Ala Asn Pro Thr Ala
1               5

<210> SEQ ID NO 95
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 95

Met Asn Val Gly Lys His
1               5

<210> SEQ ID NO 96
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 96

Val Arg Arg Val Gly Ser
```

```
<210> SEQ ID NO 97
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 97

Val Arg Thr Asn Gly Ala
1               5

<210> SEQ ID NO 98
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 98

Val Arg Lys Leu Gly Pro
1               5

<210> SEQ ID NO 99
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 99

Val Pro Ala Gly Val Ala
1               5

<210> SEQ ID NO 100
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 100

His Thr Pro Thr Arg Gly
1               5

<210> SEQ ID NO 101
<211> LENGTH: 6
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 101

Gly Thr Glu Gly Val His
1               5

<210> SEQ ID NO 102
<211> LENGTH: 6
<212> TYPE: PRT
<213> ORGANISM: Artificial Sequence
<220> FEATURE:
<223> OTHER INFORMATION: Artificially synthesized linker 2 of Ig binding
```

```
        protein

<400> SEQUENCE: 102

Ile Val Gly Gly Arg Ala
1               5

<210> SEQ ID NO 103
<211> LENGTH: 8
<212> TYPE: PRT
<213> ORGANISM: Artificial Sequence
<220> FEATURE:
<223> OTHER INFORMATION: Artificially synthesized linker 2 of Ig binding
      protein

<400> SEQUENCE: 103

Thr His Pro Glu Asp Arg Gln His
1               5
```